(12) United States Patent
Levy

(10) Patent No.: US 7,391,861 B2
(45) Date of Patent: Jun. 24, 2008

(54) INPUT DEVICES AND THEIR USE

(75) Inventor: David H. Levy, Cambridge, MA (US)

(73) Assignee: Digit Wireless, LLC, Cambridge, MA (US)

( * ) Notice: Subject to any disclaimer, the term of this patent is extended or adjusted under 35 U.S.C. 154(b) by 935 days.

(21) Appl. No.: 09/862,948

(22) Filed: May 22, 2001

(65) Prior Publication Data

US 2002/0025837 A1 Feb. 28, 2002

Related U.S. Application Data

(60) Provisional application No. 60/259,983, filed on Jan. 8, 2001, provisional application No. 60/234,959, filed on Sep. 23, 2000, provisional application No. 60/205,910, filed on May 22, 2000.

(51) Int. Cl.
*H04M 3/00* (2006.01)
*H04M 1/00* (2006.01)
*H04M 9/00* (2006.01)

(52) U.S. Cl. .................. 379/368; 379/433.07; 341/33

(58) Field of Classification Search ......... 200/511–513, 200/245, 275, 520–521; 178/18.01, 18.06; 379/368, 428.01–433.13
See application file for complete search history.

(56) References Cited

U.S. PATENT DOCUMENTS

| | | | |
|---|---|---|---|
| 3,668,337 A | 6/1972 | Sinclair | |
| 3,870,840 A | 3/1975 | Rivetta et al. | |
| 3,909,564 A | 9/1975 | Scheingold et al. | |
| 3,999,025 A | 12/1976 | Sims, Jr. | |
| 4,357,646 A | 11/1982 | McVey et al. | |
| 4,376,238 A | 3/1983 | Martin | |
| 4,400,593 A | 8/1983 | Kunz | |
| 4,490,587 A | 12/1984 | Miller et al. | |
| 4,549,279 A | 10/1985 | Lapeyre | |
| 4,604,509 A | 8/1986 | Clancy et al. | |

(Continued)

FOREIGN PATENT DOCUMENTS

DE 19702225 5/1998

(Continued)

OTHER PUBLICATIONS

International Search Report for Application PCT/US01/16461, mailed Jul. 24, 2002.

(Continued)

*Primary Examiner*—Ramnandan Singh
(74) *Attorney, Agent, or Firm*—Fish & Richardson P.C.

(57) ABSTRACT

A keypad in which output keystrokes are determined both from individual switch activation and from the combined activation of adjacent switches. The keypad has a substrate carrying an array of sense elements arranged to change state in response to keypad operation, a flexible cover disposed above the substrate and having an exposed surface defining an array of independent key regions, with combination key regions defined in interstices between adjacent independent key regions. Snap elements provide tactile feedback. Some versions have a touch-sensitive grid rather than a switch matrix. A method of dialing a telephone includes generating a corresponding sequence of numerals by transposing alpha character input into one of the numerals 2 through 9 according to standard telephone keypad letter-number correspondence

46 Claims, 21 Drawing Sheets

U.S. PATENT DOCUMENTS

| | | | |
|---|---|---|---|
| 4,634,818 | A | 1/1987 | Hayes-Pankhurst et al. |
| RE32,419 | E | 5/1987 | Rooney |
| 4,680,577 | A | 7/1987 | Straayer et al. |
| 4,839,474 | A | 6/1989 | Hayes-Pankhurst et al. |
| 4,891,777 | A | 1/1990 | Lapeyre |
| 4,899,137 | A | 2/1990 | Behrens et al. |
| 4,912,462 | A | 3/1990 | Washizuka et al. |
| 4,994,992 | A | 2/1991 | Lapeyre |
| 5,124,689 | A | 6/1992 | Franz et al. |
| 5,269,004 | A | 12/1993 | Comerford et al. |
| 5,278,557 | A | 1/1994 | Stokes et al. |
| 5,311,175 | A | 5/1994 | Waldman |
| 5,329,079 | A | 7/1994 | English et al. |
| 5,358,344 | A | 10/1994 | Spence |
| 5,457,454 | A | 10/1995 | Sugano |
| 5,459,461 | A | 10/1995 | Crowley et al. |
| 5,465,290 | A | 11/1995 | Hampton et al. |
| 5,486,823 | A | 1/1996 | Tsai |
| 5,491,745 | A | 2/1996 | Roeder |
| 5,528,235 | A | 6/1996 | Lin et al. |
| 5,535,421 | A | 7/1996 | Weinreich |
| 5,612,690 | A | 3/1997 | Levy |
| 5,635,958 | A | 6/1997 | Murai et al. |
| 5,638,092 | A | 6/1997 | Eng et al. |
| 5,691,716 | A | 11/1997 | Crowley et al. |
| 5,793,312 | A | 8/1998 | Tsubai |
| 5,852,414 | A | 12/1998 | Yu et al. |
| 5,861,588 | A | 1/1999 | Gillot |
| 5,861,823 | A | 1/1999 | Strauch et al. |
| 5,940,015 | A * | 8/1999 | Thornton et al. ............. 341/20 |
| 5,973,621 | A | 10/1999 | Levy |
| 6,037,882 | A | 3/2000 | Levy |
| 6,107,997 | A | 8/2000 | Ure |
| 6,204,839 | B1 | 3/2001 | Mato, Jr. |
| 6,259,044 | B1 * | 7/2001 | Paratore et al. ............. 200/5 A |
| 6,377,685 | B1 * | 4/2002 | Krishnan ............... 379/433.07 |
| 6,473,069 | B1 * | 10/2002 | Gerpheide ................... 345/157 |
| 6,535,200 | B2 * | 3/2003 | Philipp ....................... 345/168 |
| 7,092,520 | B2 * | 8/2006 | Fuhrmann et al. ...... 379/433.11 |

FOREIGN PATENT DOCUMENTS

| | | |
|---|---|---|
| DE | 3811737 | 10/1999 |
| EP | 0210097 | 1/1987 |
| EP | 0 322 515 | 7/1989 |
| EP | 0367204 | 5/1990 |
| EP | 0508563 | 10/1992 |
| JP | 01006337 | 1/1989 |
| NL | 1009109 | 11/1999 |
| WO | WO 00/44014 | 7/2000 |

OTHER PUBLICATIONS

Partial International Search Report for International Application No. PCT/US01/16461 Mailed Jan. 29, 2002.

* cited by examiner

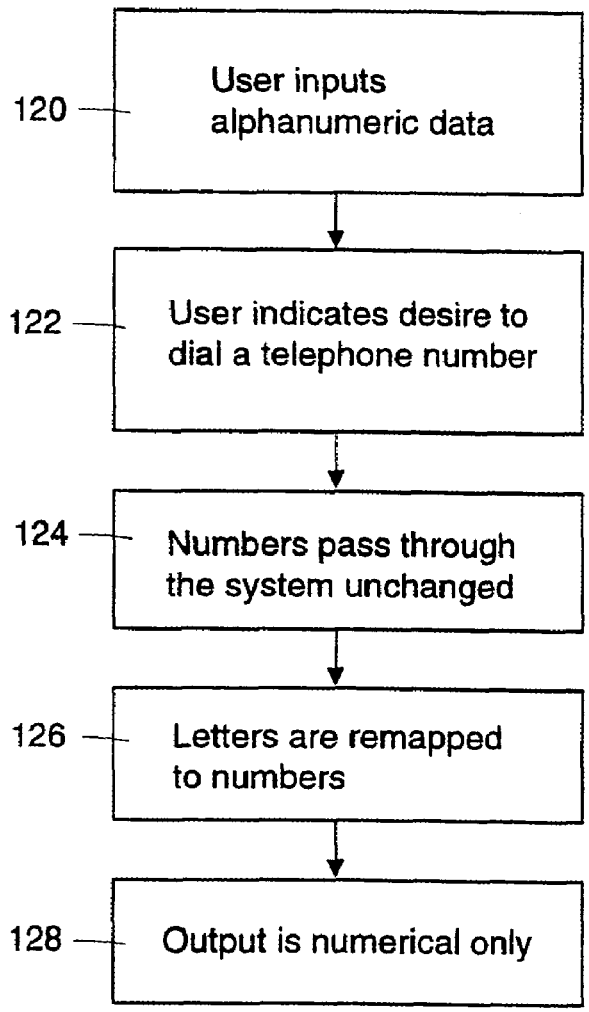
FIG. 36
ABC ⟶ 2
DEF ⟶ 3
GHI ⟶ 4
JKL ⟶ 5
MNO ⟶ 6
PQRS ⟶ 7
TUV ⟶ 8
WXYZ ⟶ 9
FIG. 37
PRIOR ART
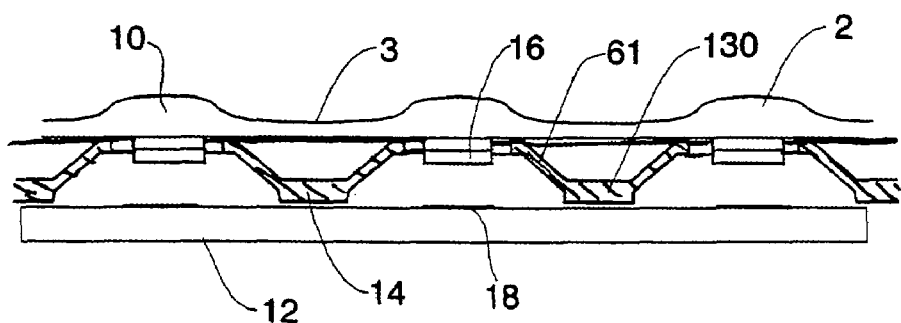
FIG. 39

INPUT DEVICES AND THEIR USE

CROSS-REFERENCE TO RELATED APPLICATIONS

This patent application claims priority from U.S. provisional patent application No. 60/205,910, filed May 22, 2000; 60/234,959, filed Sep. 23, 2000; and No. 60/259,983, filed Jan. 8, 2001, the entire disclosures of which are incorporated herein by reference.

TECHNICAL FIELD

This invention relates generally to devices, such as touchpads, keypads and voice recognition systems, for inputting data into electronic devices, and more particularly to keypads in which output keystrokes are determined both from individual switch activation and from the combined activation of adjacent switches.

BACKGROUND

The miniaturization of electronic products is one of the primary tenets of technologic advance. Competitive advantage and the success of a product line largely hinges on the ability of a company to successfully provide products that are both increasingly functional and increasingly portable. As technology advances, it becomes increasingly possible to miniaturize electronic circuitry below human scale, with the result being that the interface (e.g., screens, keypads, cursor control devices) can come to limit the size of portable products. Therefore, as portable products enter this realm, the ergonomic quality and size of their input devices (such as keypads) will have a growing significance to product acceptance and success. Of special significance is the telephone keypad, because it has such importance worldwide as a fundamental communication and economic tool. International standards have been established, for example, for the minimum dimension between adjacent key switches to accommodate typical human fingertips. By "key" I mean an element, of an array of elements over a surface, which when struck produces an identifying output corresponding to the location of the element. The term "key region" includes, for example, a localized region having key-like behavior on a touch-screen and a localized region of a keypad formed by placing a membrane over an array of contact switches. A "keypad" is an array of keys or key regions and includes, among other things, a conventional keypad (such as is found on most telephones, calculators and such), a keyboard, and similar touch-sensitive arrangements implemented with a touch-screen or with demarcated zones on a membrane surface. While such a surface is commonly planar, it may also be curved.

Some of my earlier work has been directed at reducing the size of keypads through the development of keypads in which output keystrokes are determined both from individual switch activation and from the combined activation of adjacent switches. Some of my earlier work is disclosed in my U.S. Pat. Nos. 5,612,690 and 5,973,621, the entire contents of which are incorporated herein by reference. I refer to such keypads herein as "IACK" keypads, or Independent-And-Combination-Key keypads.

In this context, "independent keys" or "independent key regions" are elevated regions of a keypad surface with individual graphical elements, which provide a corresponding output when individually pressed. A "combination key" or "combination key region," on the other hand, is a locally depressed region of an IACK keypad surface that provides a unique output as a consequence of the simultaneous or near-simultaneous manipulation of a set of two or more adjacent (e.g., diagonally adjacent or "kitty-corner"), independent key regions, typically corresponding to a central graphical element. I use the term "defined combination" to refer to any combination of independent keys that corresponds to a combination key, as interpreted by an associated device. Conversely, an "undefined combination" is a set of independent keys that do not, when simultaneously depressed, correspond to a defined combination key.

Thus, an IACK keypad is a keypad that includes both independent and combination keys or key regions. Such keypads typically have independent key regions identified by graphical elements on surfaces slightly elevated above adjacent surfaces carrying other graphical elements that identify combination key regions, for example. It is possible to design such keypads with advantageously very small spacing between adjacent independent key regions.

It is desirable to increase the accuracy of IACK keypads and other input devices with respect to the interpretation of the intent of the user, regardless of the switch technology used. There is a special need to better determine whether the user intends an individual or a combination key output in an IACK keypad, in those implementations when a strong tactile feedback is desired, such as is provided by metal snap domes. Improvements in the ergonomics of such keyboards are also desired, as well as better algorithms to simplify the interpretation of input, such as for use in telephones and such.

Additional improvements in the design and implementation of keypads and other input devices are desired.

SUMMARY

The present invention features improvements in the design of IACK keypads and other data input means, and their integration into electronic devices.

According to one aspect of the invention, a telephone with an IACK keypad defining both combination key regions and independent key regions arranged in alternating columns has columns of combination key regions that include multiple numerical columns together including numerical regions corresponding to numerals 0 through 9, with each numerical column containing a plurality of the numerical regions, and at least one other column containing key regions corresponding to punctuation symbols.

Preferably, the telephone has three numerical columns, such that the numerical columns together form a standard telephone key layout, with a left numerical column containing 1, 4, 7, a middle numerical column containing 2, 5, 8, 0, and a right numerical column containing 3, 6, 9.

In some embodiments, the key regions are defined by corresponding sensible features on an exposed surface of a flexible membrane. By "sensible" I mean capable of being sensed by the human senses. For example, the sensible features may include changes in elevation across the surface of the membrane (e.g., sensible by touch). In other cases the sensible features may be simply visual distinctions. Preferably, the numerical key regions are visibly larger than the key regions corresponding to punctuation symbols.

In some preferred embodiments, the independent key regions and the combination key regions are of different size.

The independent key regions together include, for some applications, regions corresponding to letters of an alphabet (such as the letters A through Z of the English alphabet, for example).

The independent key regions are preferably spaced apart with a spacing of no more than about one-half of a human fingertip width, for particularly compact keypad layouts, and each key region carries an associated, visible legend in some cases. The combination key regions may also be arranged in columns of alternating width.

In some configurations, the numerical columns have a visibly different coloration than the one or more columns containing predominantly punctuation symbols, and the columns may alternate in such coloration, as dark-light-dark, for example.

In a preferred embodiment, the independent key regions are arranged in six vertical columns, as determined by key legend orientation, with the independent key regions arranged in first, third, fifth, seventh, ninth and eleventh vertical columns and containing regions corresponding to letters, the numerical combination key region columns forming second, sixth and tenth vertical columns, and fourth and eighth vertical columns including key regions corresponding to punctuation symbols. Column numbering progresses from either lateral side of the keypad.

The telephone may be configured to register different punctuation symbols as one of the key regions corresponding to punctuation symbols is actuated twice in succession, preferably two or more related symbols. For example, pushing the colon key twice registers a semi-colon; pushing the period key twice registers a comma, and so forth.

According to another aspect of the invention, an IACK keypad has a cover with an exposed surface defining both combination key regions and independent key regions arranged in alternating columns, with the independent key regions comprising nubs elevated above the combination key regions. The exposed surface forms a continuous, smooth contour between adjacent independent key regions, void of delineations marking shared boundaries between adjacent independent key grid spaces of an underlying key space grid. By "continuous, smooth contour" I mean that the surface between the nubs is void of tactile delineations marking shared independent key boundaries, such as edges of independently movable keys. Such a continuous, smooth contour can (and in some cases, preferably does) carry visible legends corresponding to the combination key regions associated with such smooth surfaces.

In some preferred embodiments, the nubs are diamond-shaped, with ends or points directed between adjacent combination key regions.

According to another aspect of the invention, an IACK keypad defines both combination key regions and independent key regions arranged in alternating columns and having a standard orientation defined by legends associated with the independent and combination key regions, with the alternating columns disposed along lines canted at an angle (e.g., an angle of 45 degrees) with respect to the standard orientation of the keypad.

According to another aspect of the invention, a telephone has a keypad including key regions arranged in columns including two numerical columns, a majority of key regions in the numerical columns corresponding to selected numerals from the list consisting of 0 through 9, and at least one punctuation column, a majority of key regions in the punctuation column corresponding to punctuation symbols.

According to yet another aspect of the invention, an IACK keypad has a cover with an exposed surface defining both combination key regions and independent key regions arranged in alternating, staggered columns and alternating, staggered rows. The exposed surface forms a continuous, smooth contour between adjacent independent key regions, void of visible features marking a boundary, parallel to a column or row, between adjacent key regions.

According to another aspect of the invention, a keypad has an array of first and second sets of keys. The first set of keys is arranged in a first plurality of rows, each row having a second plurality of members, each member being a key having a contact region of a first shape and a first area, the first shape and first area corresponding at least roughly to dimensions at the tip of a human finger. The first set of keys also defines a set of interstitial regions that are unoccupied by members of the first set, while members of the second set of keys are located in the interstitial regions and have a second shape and a second area (of, e.g., a diamond shape), the second area being substantially smaller than the first area.

In some preferred embodiments, the contact region of each key in the first set lies in a first horizontal plane and the contact region of each key in the second set lies in a second horizontal plane that is disposed above the first horizontal plane.

In some applications the keypad is an IACK keypad, in which each member in the first set of keys is a combination key and each member of the second set of keys is an independent key.

In some embodiments the keypad also includes a non-linear tactile feedback system coupled to the array of keys to provide tactile feedback for each key approximately proportional to the area of the contact region of such key.

According to another aspect of the invention, an IACK keypad has a cover with an exposed surface defining both combination key regions and independent key regions arranged in alternating, staggered columns and alternating, staggered rows of a key matrix, and tactile nubs positioned just outside the key matrix, between fourth and fifth rows of combination key regions, to demark an edge of a telephone keypad consisting of combination key regions of first through fourth rows of the matrix.

In accordance with one aspect of the invention, the "interstitial" nature of combination keys is withheld from the user by eliminating the visible grid connecting independent keys as shown in prior art IACK keypads. Unlike prior art IACK keypads in which the combination keys are implemented as elements disposed at the intersection at the edges of independent keys, this invention implements independent keys as the interstitial areas of (much larger) combination keys. In accordance with another aspect of the invention, a high degree of tertiary functionality (such as punctuation) is provided in a telephone layout of an IACK keypad by alternating columns between classes of characters, such as numbers, punctuation, numbers, punctuation, numbers. This aspect may be further improved by alternating the width and/or coloration of adjacent rows. In accordance with one aspect of the invention, the IACK keypad structure is rotated 45 degrees, thereby creating a reduced width IACK keypad. This structure enables a standard "QWERTY" layout to provide a high standard of ergonomic comfort in a narrow width (of as little as 58 millimeters, for example).

According to another aspect of the invention, a touch-sensitive input device (such as a keypad or touchpad, for example) has an exposed, continuous surface defining a planar area, and a grid of sense elements coextensive with the area of the exposed surface and responsive to engagement of the exposed surface by an operator to establish a position of said engagement on the exposed surface. The exposed surface varies in elevation across its planar area to form a series of tactile features.

In some embodiments, the tactile features comprise elevated nubs. Preferably, the elevated nubs extend at least about 0.75 millimeter from adjacent regions of the exposed surface. In some instances, the exposed surface of the device carries legends associated with said tactile features. The tactile features may define distinct regions of the surface corresponding with associated alphanumeric characters, for some applications.

In some cases, the input device is configured to output a sequence of alphanumeric characters as corresponding tactile features of the surface are engaged sequentially, such as with a keypad. In some preferred embodiments, the device is an IACK keypad, with the tactile features comprising nubs defining independent key regions of the IACK keypad. Preferred embodiments also include an electronic circuit adapted to temporarily display alphanumeric characters on a screen as an operator traverses the exposed surface, the displayed alphanumeric characters being selected to correspond to a position of engagement of the exposed surface by the operator.

According to another aspect of the invention, an electronic device comprises an IACK keypad having an exposed, continuous surface defining both independent key regions and combination key regions, a grid of sense elements underlying the surface of the keypad and responsive to position of a human finger on the surface of the keypad, and an electronic circuit adapted to receive signals from the IACK keypad indicative of keypad status and to produce an output in response to keypad actuation by an operator. The electronic circuit is configured to determine an intended combination key input based at least in part upon a sensed position of a finger between centers of adjacent independent key regions.

In some embodiments the device also has a key switch matrix responsive to engagement of independent key regions, the electronic circuit being configured to determine intended combination key input based on both the sensed finger position and a state of the key switch matrix. In some cases the grid of sense elements and the key switch matrix share some conductive traces of a printed circuit board.

The grid of sense elements may have a grid spacing wider than a spacing between centers of adjacent independent key regions and still provide acceptable resolution.

According to yet another aspect of the invention, an electronic device has a substrate carrying a first array of spaced apart, conductive trace elements and a flexible cover disposed above the substrate and carrying a second array of spaced apart, conductive trace elements. The first and second arrays together form a coordinate system, with the cover separated from the substrate by an array of resilient, collapsible elements and having an exposed, continuous surface. The first and second arrays of trace elements also form a capacitive grid responsive to presence of a digit of an operator on the surface of the cover. An electronic circuit is adapted to sense a capacitive state of the grid and to determine a position of said digit upon the sensed capacitive state.

In some preferred embodiments, the continuous surface defines key regions of a keypad, and the electronic circuit interprets intended keypad input based at least in part upon the sensed capacitive state of the grid.

In some cases, the capacitive grid is responsive to a position of local deflection of the cover toward the substrate, and the collapsible elements comprise formations integrally molded to extend from a surface of the cover facing the substrate.

In an illustrated embodiment, the device is in the form of an IACK keypad, with the exposed cover surface defining both independent key regions and combination key regions.

According to another aspect of the invention, a keypad includes an outer cover with an exposed, continuous surface defining key regions, a grid of sense elements underlying the surface of the cover and responsive to position of a human finger on the surface of the keypad, and a single switch adapted to change state when any one of a multiplicity of the key regions is pressed (preferably, when any key region of the keypad is depressed).

In some embodiments, the keypad is an IACK keypad, with the exposed cover surface defining both independent key regions and combination key regions, and the single switch adapted to change state when any independent key region is depressed. The independent key regions may be elevated above the combination key regions.

According to one aspect of the invention, an input device has a cover with an exposed surface defining regions associated with corresponding discrete inputs, and a substrate below the surface. The cover carries one array of a variable capacitance grid, and the substrate carries another, preferably perpendicular, array of the grid. The device also has an electronic circuit adapted to interpret large-scale capacitance variations of the grid as a localized deflection of the cover toward the substrate in a region identified by the capacitance variation, and to interpret small-scale capacitance variations of the grid as an orientation and extent of motion of a finger along the surface.

In accordance with one aspect of the invention, an at-a-distance measurement device is integrated into an IACK keypad. In one of its embodiments, this measurement device is employed to increase the reliability and accuracy of an IACK keypad. By identifying the location of the finger in addition to or independently from an associated matrix of switches, the errors that may arise from an ambiguous subset of switches in a combination key may be eliminated. In another embodiment the measurement device is disposed beneath an IACK keypad to provide "mouse" functionality. In some preferred embodiments, the integrated system has the same number of electrical lines as the IACK device alone. In one embodiment two perpendicularly-oriented arrays are disposed on different elements: one on the PCB and one on the underside of the IACK element. In this embodiment, parasitic capacitive variations (between the array intersections) are used for positioning of the finger for both mouse and keypad functions, while physical displacement of the IACK element creates capacitive variation that is relatively huge in comparison to the parasitic variation. Therefore, finger motion may be easily distinguished from key activation despite the superimposition of the signals. In another embodiment the at-a-distance measuring device and the keypad matrix are integrated. In another embodiment piezo-ceramic elements (disposed in a sheet across the surface or discretely) are used to generate a tactile response. Tactile response may also be provided by the same element used to vibrate the device because the frequencies within this range are difficult for human finger to localize.

Integrating a location measuring system and an IACK keypad can provide several advantages. For example, while in a mouse mode the IACK keypad surface can provide stability for the finger in mobile situations. This is a serious issue because of the constant intermittent erratic motions inherent in travel. For a user to accurately control a cursor of a small handheld device (such as a phone) while traveling by bus, train, car, or while walking is a frustrating task. Prominent reference elevations, placed along the surface of a touchpad or other cursor control location measuring system can solve this problem by proving reference points to finger location. The prominent reference elevations of some embodiments can give the user tactile reference, enabling the user to better maintain hand position by providing a small ledge that mechanically stabilizes the finger. When the finger is between elevations the support is provided by the elevations that surround it, and when the finger is at an intermediate location over an elevation, the compliance of the finger serves to capture the elevation within the flesh of the finger. By stabilizing the finger in this way, a high degree of accuracy may be provided in travel situations that would otherwise be frustrating. The device can be configured to output audio cues (such as a digitized voice saying the letters and numbers) or visual cues (such as changing the character displayed, especially in an oversized font, potentially filling a large fraction of the screen) as the user moves their finger across the face of the device. The audio implementation is particularly useful for blind users and the visual version is particularly useful for the sight-impaired. The invention can provide much needed consistency and efficiency for a user while enabling access of both mouse and IACK keypad functions without moving the hand.

According to another aspect of the invention, an IACK keypad having a substrate carrying an array of sense elements arranged to change state in response to keypad operation, and a flexible (e.g., elastomeric) cover disposed above the substrate and having an exposed surface defining an array of independent key regions, with combination key regions defined in interstices between adjacent independent key regions, also has an array of discrete snap elements extending between the cover and the substrate and spacing the cover from the substrate. The snap elements are each located between two adjacent independent key regions and adapted to resiliently collapse as a non-linear response to local pressure against the exposed cover surface to provide tactile feedback of keypad operation.

In some cases, the snap elements are located under the combination key regions. In some cases, the snap elements are located between directly adjacent independent key regions. By "directly adjacent" I mean independent key regions not defining a combination key region directly between them, such as adjacent independent keys of adjacent columns in a staggered matrix. In some cases, the snap elements include snap elements located under the combination key regions and snap elements located directly between directly adjacent independent key regions.

In some embodiments, each independent key region and each combination key region has four corresponding, spaced-apart snap elements disposed at its periphery, with each interstice between four adjacent snap elements corresponding to a key region. The snap elements are preferably each located equidistant between centers of adjacent independent key regions and equidistant between centers of adjacent combination key regions.

In some instances, each independent key region defines an exposed contact pressure area, the keypad further comprising an array of conductive pills between the substrate and cover. Each conductive pill is centered below a corresponding independent key region and extends laterally farther (e.g., toward an adjacent combination key region) than the contact pressure area of its associated independent key region. By "contact area" I mean the area of the independent key region that acts as a button during operation, in the sense of transmitting force from the operator's finger to deflect the keypad cover. Such area does not include area which only comes into incidental, non-loading contact with the operator's fingertip. Thus, substantially all (e.g., 90 percent) of the load applied by the operator during operation of a single independent key region is applied to the contact pressure area.

Some embodiments include an array of discrete snap elements extending between the cover and the substrate and spacing the cover from the substrate. The snap elements are each located between two adjacent independent key regions and are adapted to resiliently collapse as a non-linear response to local pressure against the exposed cover surface to provide tactile feedback of keypad operation.

In some cases the independent key regions comprise raised nubs with upper surfaces having distal edges that circumscribe their contact pressure areas, or are of diamond shape, with arms directed between adjacent combination keys.

In some configurations each pair of adjacent independent key regions has three of the snap elements disposed along a line segment disposed midway between the pair of independent key regions (e.g., along a boundary separating the two independent key regions). Preferably, the three snap elements are equally spaced along the line segment, with one directly between centers of the independent key regions of the pair, and one at either end of the line segment, at an interstice between four adjacent independent key regions.

In some particularly preferred embodiments, the snap elements are of elastomer (e.g., silicone) integrally molded with and extending from a back surface of the cover.

In some illustrated instances, the snap elements are of frustoconical shape.

Preferably, the snap elements are advantageously arranged to provide a substantially equal tactile feedback in response to pressure against both independent key regions and combination key regions. It is also preferable that the snap elements be constructed and arranged to require a substantially equal normal activation force for both independent key regions and combination key regions.

According to another aspect of the invention, an IACK keypad has a substrate carrying an array of sense elements arranged to change state in response to keypad operation; a flexible (e.g., elastomeric) cover disposed above the substrate and having an exposed surface defining an array of independent key regions, with combination key regions defined in interstices between adjacent independent key regions; and an array of discrete snap elements extending between the cover and the substrate and spacing the cover from the substrate. The snap elements are each located between two adjacent independent key regions and adapted to resiliently collapse toward the substrate as a non-linear response to local pressure against the exposed cover surface to provide tactile feedback of keypad operation.

The snap elements are also each symmetric in shape about an associated axis perpendicular to the substrate and intersecting the cover between adjacent independent key regions.

Preferably, the snap elements are frustoconical in shape, or of a shape adapted to provide the same function in the same way as a hollow, volcano-shaped frustocone, and produce substantially the same non-linear buckling response.

In some cases, the snap elements are of elastomer integrally molded with and extending from a back surface of the cover.

In some embodiments, each independent key grid space has at least four corresponding, spaced-apart snap elements disposed at its periphery, with each interstice between four adjacent snap elements corresponding to a key region. Preferably, the snap elements are arranged to provide a substantially equal tactile feedback in response to pressure against both independent key regions and combination key regions.

According to another aspect of the invention, an IACK keypad has a substantially planar substrate carrying an array of sense elements arranged to change state in response to keypad operation, a flexible cover disposed above the substrate and having an exposed surface defining an array of key regions arranged in rows, and at least one continuous, elongated snap element extending adjacent at least three key regions of one row of key regions, between the cover and the substrate and spacing the cover from the substrate. The snap element is adapted to resiliently collapse as a non-linear response to local pressure against the exposed cover surface to provide tactile feedback of keypad operation.

In some constructions, the keypad has multiple such snap elements in the form of elongated rails extending between adjacent rows of key regions.

The snap element may comprise a rib, for example, extending at an angle (of, e.g., 60 degrees) with respect to the plane of the substrate and configured to buckle in response to local pressure against the exposed cover surface.

According to another aspect of the invention, an IACK keypad includes a substantially planar substrate carrying an array of sense elements arranged to change state in response to keypad operation, and a flexible cover disposed above the substrate and having an exposed surface defining an array of independent key regions arranged in rows and columns, with combination key regions between adjacent independent key regions. The cover also has a back surface facing the substrate and held away from the substrate by collapsible snap elements between the cover and substrate, with the back surface carrying an array of conductive pills located beneath corresponding independent key regions. Each conductive pill extends across the back surface of the substrate toward an adjacent combination key region center a lateral distance equal to between about 50 percent and 70 percent (preferably about 50 percent) of a distance between the adjacent combination key region center and a center of the independent key region corresponding to the pill.

In some configurations the conductive pills are cross-shaped, with arms extending toward multiple adjacent combination key regions.

Preferably, each conductive pill has a distal edge nearest the adjacent combination key region substantially perpendicular to a line connecting the adjacent combination key region center and a center of the independent key region corresponding to the pill.

In some cases, the pills have contact surfaces facing the substrate that have outer regions that slope away from the substrate.

According to another aspect of the invention, an IACK keypad has a substantially planar substrate carrying an array of sense elements arranged to change state in response to keypad operation, and a flexible cover disposed above the substrate. The cover has an exposed surface defining an array of independent key regions arranged in rows and columns, with combination key regions between adjacent independent key regions, and a back surface facing the substrate and held away from the substrate by collapsible snap elements between the cover and substrate. The back surface carries an array of conductive pills located beneath corresponding independent key regions, with each conductive pill having a contact surface facing the substrate that has outer regions that slope away from the substrate.

In some preferred embodiments, the conductive pills are cross-shaped, with arms extending toward multiple adjacent combination key regions and the arms of the conductive pills comprising the sloping outer regions.

Preferably, each conductive pill extends across the back surface of the substrate toward an adjacent combination key region center a lateral distance equal to between about 40 percent and 99 percent (more preferably between about 50 percent and 90 percent, and most preferably between about 70 percent and 80 percent) of a distance between the adjacent combination key region center and a center of the independent key region corresponding to the pill.

According to another aspect of the invention, an IACK keypad having a substrate carrying an array of sense elements arranged to change state in response to keypad operation, and a flexible (e.g., elastomeric) cover disposed above the substrate and having an exposed surface defining an array of independent key regions, with combination key regions defined in interstices between adjacent independent key regions, also has an array of discrete snap elements extending between the cover and the substrate and spacing the cover from the substrate. The snap elements are each located between two adjacent independent key regions and adapted to resiliently collapse as a non-linear response to local pressure against the exposed cover surface to provide tactile feedback of keypad operation, and are arranged to provide a substantially equal tactile feedback in response to pressure against both independent key regions and combination key regions.

In accordance with another aspect of the invention, elastomeric cones are molded into the underside of an IACK element utilizing a novel manufacturing method including a matrix of conical-shaped through holes. In accordance with another aspect of the invention, tactile feedback elements are disposed at intermediate points between adjacent Independent keys and may be comprised of elastomeric cones are molded into the underside of an IACK element. In accordance with another aspect of the invention, the tactile feedback elements of an IACK keypad are comprised of a metallic element stamped to include arcuate elements disposed at intermediate points between adjacent Independent keys.

According to another aspect of the invention, a method of interpreting IACK keypad input is provided. The method includes sensing keypad input corresponding to a combined actuation of a plurality of independent key regions of the keypad, and comparing the sensed input to defined sets of independent key inputs corresponding to combination keys. For sensed inputs found to correspond to a plurality of independent key regions associated with a combination key, a combination key input is registered. For sensed inputs found not to correspond to any combination key, the sensed input is compared to recorded custom chorded key associations. For sensed inputs found to correspond to a recorded custom chorded key association, a sequence of characters according to the corresponding chorded key association is registered.

In some implementations, a sequence of characters determined solely by the plurality of independent key regions of the sensed input is generated, for sensed inputs found not to correspond to any combination key or to any recorded custom chorded key association. In some cases, the sequence of characters is generated by arranging the independent key regions of the input according to a predetermined order.

In some applications, an association between the sensed input and a selected string of characters is stored in readable memory, for sensed inputs found not to correspond to any combination key or to any recorded custom chorded key association. Characters contemporaneously shown on a display when the input is sensed, for example, may define the selected string of characters.

In some embodiments, for sensed inputs found not to correspond to any combination key, the method includes comparing the sensed input to an input character last registered prior to the sensed input to determine whether the last registered character is among the plurality of independent key regions of the sensed input, and, for last registered characters found to be among the plurality of independent key regions of the sensed input, deleting that last registered character.

In accordance with another aspect of the invention, the electronics and accompanying algorithms of an IACK keypad have been implemented to simultaneously register the input from a plurality of keys as the means for a user to instantaneously input a specific sequences of numbers such as Personal Identification Number (PIN), or access codes (such as a telephone number, followed by a PIN number). In accordance with another aspect of the invention an algorithm provides a mapping from inputs of alphabetic keys to numeric key outputs as dictated by the correlations of the standard 12 key telephone pad.

The invention can, in some aspects, taking advantage of the ability of the IACK keypads disclosed above to detect simultaneous input from any combination of independent key regions, even non-adjacent ones. This method is advantageous for providing a secure, yet fast, means to enter numeric codes, for applications such as: providing access to web sites and other phone-based services and content; entering one's own telephone number followed by PIN as a means to access voice mail; and the like.

According to another aspect of the invention, a telephone has a keypad defining alpha key regions corresponding to individual letters, and numerical key regions corresponding to individual numerals, and an electronic circuit connected to the keypad to receive input therefrom as various key regions are engaged by an operator. The electronic circuit is configured to translate alpha key input into numerical output in the form of a combination of numerals 2 through 9, based upon standard telephone keypad letter-number correspondence. By "telephone", I mean in one sense a device capable of accepting input from an operator and generating a corresponding code recognizable as representing a telephone number associated with the input. This would include, for example, standalone devices that generate a telephone number (e.g., by the recited transposition) but are not connected to a network. In a narrower sense, I mean a device connected to a telephonic network (either hardwired or wireless) for communication over the network.

In some embodiments the electronic circuit is configured to, in a first mode, display an individual letter in response to engagement of a selected alpha key region, and to, in a second mode, display one of numerals 2 through 9 in response to engagement of the selected alpha key region, the displayed numeral selected according to standard telephone keypad letter-number correspondence.

The electronic circuit is configured, in some applications, to register a sequence of letters as their associated alpha key regions are engaged, and, in response to additional input from the operator, transpose the registered sequence of letters into a telephone number according to standard telephone keypad letter-number correspondence. In some instances the electronic circuit is further adapted to, in response to said additional input, initiate a telephone call using the telephone number.

Preferably, the electronic circuit is adapted to register numerical output according to the numerals associated with the numerical key regions, such that numerical input is unaffected by transposition.

According to another aspect of the invention, a method of dialing a telephone is provided. The method includes entering a desired sequence of alphanumeric characters including at least one alpha character. The telephone generates a corresponding sequence of numerals by transposing the alpha character into one of the numerals 2 through 9 according to standard telephone keypad letter-number correspondence.

In some cases, the method also includes instructing the telephone to generate the corresponding sequence of numerals after the alphanumeric sequence has been entered.

In many embodiments useful in English-speaking countries, for example, the desired sequence of alphanumeric characters is entered on a keypad including at least 24 individual key regions, each key region corresponding to a different alphabet letter.

In some embodiments, the desired sequence of alphanumeric characters is in the form of a pronounceable utterance and entered by pronouncing the utterance. For example, the sequence of alphanumeric characters may comprise a series of alpha characters that spells a pronounceable text, such as "1-800-FLOWERS". These embodiments are preferably implemented with voice recognition algorithms that distinguish between pronounceable text that identifies a number (such as "one, eight-hundred") from that which does not (such as "flowers"), and transposes only non-numerical text, particularly when interpreting the number-identifying text as a number generates a telephone number of reasonable length and format.

The details of one or more embodiments of the invention are set forth in the accompanying drawings and the description below. Other features, objects, and advantages of the invention will be apparent from the description and drawings, and from the claims.

DESCRIPTION OF DRAWINGS

FIG. 7A shows a keypad with snap elements formed by an array of high-deformation type piezoelectric devices, while

FIG. 36 illustrates an algorithm for reverse mapping alphanumeric data to generate a numerical output.

FIG. 37 shows a standard telephone keypad letter-number correspondence.

FIG. 39 shows a keypad with a molded tactile feedback sheet having an array of conical snap elements.

Like reference symbols in the various drawings indicate like elements.

DETAILED DESCRIPTION

Figure 1:
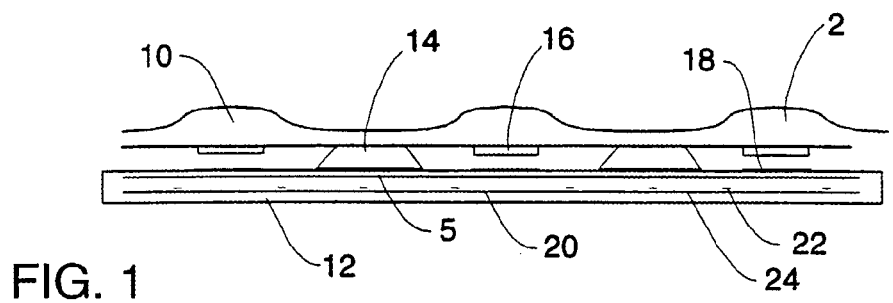
FIGS. 1 and 2 are cross-sectional views of two keypad embodiments with integrated location measuring systems.
Figure 9:
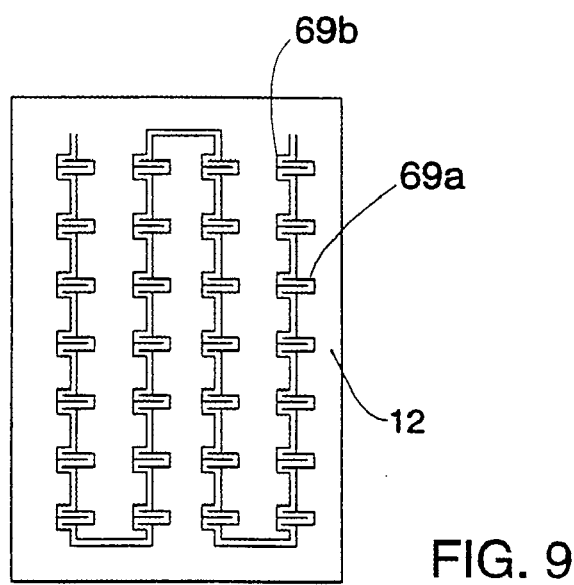
FIG. 9 shows a keypad substrate with a single pair of electrical traces providing contact for all of the switches in the matrix.

Referring first to FIG. 1, a flexible membrane keypad element 10 extends over a printed circuit board (PCB) 12 having both a common key switch matrix 5 and an at-a-distance location measuring system 20. Key switch matrix 5 is disposed on the upper surface of PCB 12 and has perpendicularly oriented conductive traces whose intersections form switch grid pads 18 that are momentarily connected by contact with conductive pills 16 carried on the lower surface of membrane 10 directly above corresponding pads 18. Membrane 10 has an undulating upper surface that forms elevated independent key regions 2 separated by valleys that correspond to combination keys. Conductive pills 16 may be of a solid material impregnated with a conductive material, such as carbon, or of a non-conductive material (such as the material of membrane 10) with a conductive ink or coating. In this embodiment measuring system 20 includes two overlapping arrays of linear elements (shown here as mutually orthogonal planar arrays 22 and 24, each printed as a layer of printed circuit board 12. Such measuring devices are employed, for example, in touchpads and other two-dimensional position-responsive computer input devices. With the grid spacing as shown, measuring system 20 is employed to increase the accuracy of the IACK keypad by helping with the interpretation of indefinite keypad manipulation to determine intended individual and combination keypad input. For example, in keypads with combination keys corresponding to the simultaneous activation of four independent keys, it is common for an inaccurate finger placement to actuate only two adjacent keys (especially in embodiments utilizing discrete key switch technologies), resulting in ambiguity. In keypads with combination keys corresponding to the simultaneous activation of two independent keys, it is common for an inaccurate finger placement to actuate only one of the two independent keys, resulting in erroneous individual key output. For example, it is possible to have combination keys located at or beyond the edges of an IACK keypad and to generate inputs associated by such keys when two adjacent independent keys in a column along the edge are actuated together, although this can, in some cases, result in an increased error rate. However, by independently determining the position of the finger with location measuring system 20, it becomes possible to correctly resolve such inaccuracies and correctly interpret the intended input. For example, when a 4-key-based output is desired the finger will be predominantly located over the associated interstitial graphic corresponding to the combination key, yet due to an angling of the finger or physical anomalies of the user's finger, the pressure points may include only the lower two switch grid pads 18. In this case, the ambiguity may be resolved by location measuring system 20, even with a relatively low resolution. Relatively inexpensive analog to digital converters may be employed to provide resolution on the order of ¼ finger width, or about 10 to 20 times lower resolution than in typical commercially available location measuring systems. Likewise, using this technique, an actuation of a single key can be used to accurately interpret user-intent in an IACK keypad, with the location measuring system 20 providing location information and an actuation at any one of switch grid pads 18 providing "go/no go" information. This includes a non-traditional key switch matrix 6 in which a single contact may be made at any location across the keypad as shown in FIG. 9.

Measuring system 20 also provides integrated "mouse" (cursor control) functionality with IACK keypad scanning in a single PCB 12. In this embodiment, location-measuring system 20 operate in two modes. In a first mode it provides position location information regarding the location of the finger with respect to an IACK keypad surface, to improve the accuracy of IACK combination key manipulation interpretation, as discussed above. In a second mode, it is employed to orient a cursor on the display of the product attached to the keypad. The user may efficiently transfer between 'mouse mode' and 'keypad mode' with the touch of a button (not shown), for example. Enabling the user to selectively turn off either combination key functionality or independent key functionality in an IACK keypad can have other advantages: in gaming applications, for example, the combination keys may assume a directionality function; for persons with a palsy or other such muscular disorder it eases accessibility to the function of choice; etc.

In some configurations, the input and output lines of the location measuring system 20 and traditional key switch matrix 5 are advantageously tied together, so as to minimize the pin count, or even to not increase the overall pin count beyond what is required by a traditional keypad alone, for example.

Figure 2:
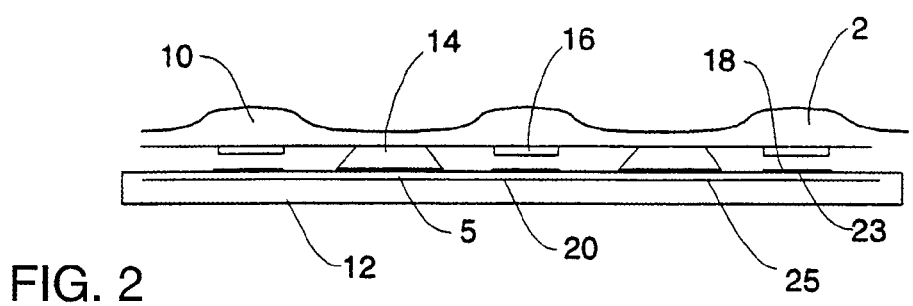
Figure 3:
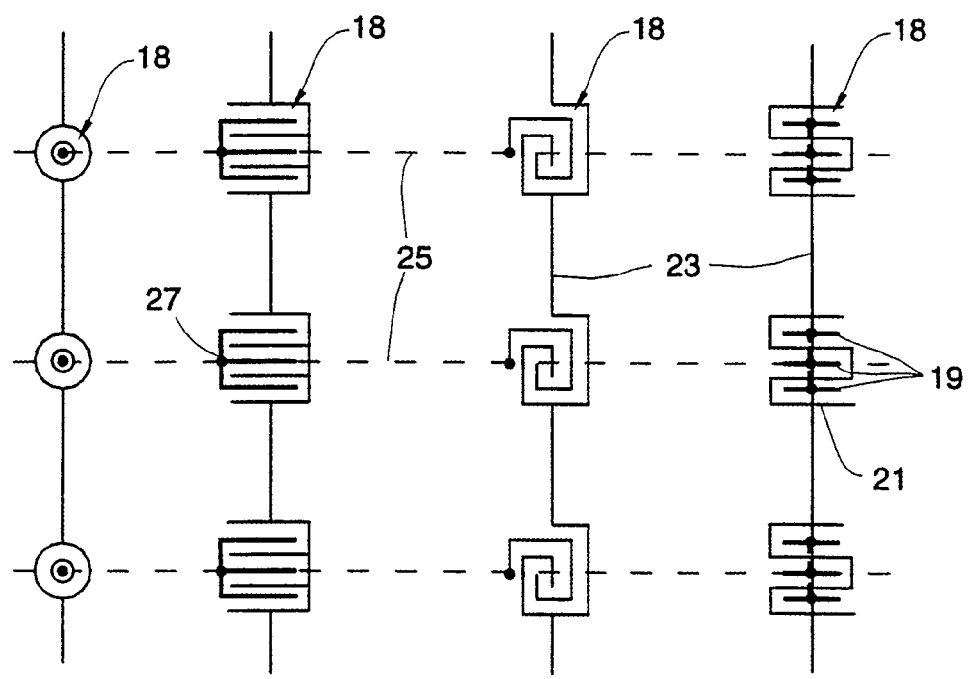
FIG. 3 is a plan view of an integrated location measuring grid and key switch matrix, showing four different types of key switch grids.

Referring to FIGS. 2 and 3, the dashed lines are traces submerged within the PCB are shown as dashed lines, traces at the PCB surface are shown as solid lines, and vias or holes connecting the two layers are shown as dots. Integrated vertical array 23 is disposed at the surface of PCB 12 (to reduce the number of vias) and forms both one-half of key switch matrix 5 and the vertical array of the location measuring system. Likewise, integrated horizontal array 25 forms the other half of key switch matrix 5 and the horizontal array of the location measuring system. In this case, array 25 is disposed within PCB 12. Switch grid pads 18 are located at each junction of arrays 23 and 25, and each consists of an interdigitated arrangement of exposed elements on the surface of the PCB, thereby forming a capacitive grid element for location measuring system 20 with a plurality of switch grid pad 18 halves integrated within it. Each column of FIG. 3 shows a different design for pads 18. The leftmost column shows switch grid pad 18 with the contact elements designed for use with a snap dome switch technology. The column second from the left shows an interdigitated pad with a single via. The column second from the right shows a spiral pattern and a single via. The rightmost column shows first elements 19 (shown three in number for each grid pad) interconnected by a short vertical element disposed on the surface of the PCB on the left most element of array 23, and a short vertical element disposed within the PCB on the other two elements of array 23. Second elements 21 are interdigitated with first elements 19 and connected to each other by an integrated horizontal array 25 through associated holes or vias 27. In each case the elements of switch grid pad 18 are symmetrically disposed with respect to the elements of location measuring system 20, thereby providing a self-canceling signal and not compromising accuracy of the location measuring system 20 despite the integration of the key switch matrix, such that a consistent output is measured independent of the direction from which the finger approaches the switch.

Input 31 is comprised of the signals injected into integrated horizontal array 25, and output 33 is comprised of the signals received by integrated vertical array 23. Thus, the total number of pins required of a microprocessor or an analog-to-digital converter that conditions the signal for input to a microprocessor is the same as needed for the traditional key switch matrix 5 alone.

Changes in parasitic capacitance across switch grid pad 18 may also be used to detect approach or proximity of finger or conductive pills 16. This can provide additional information necessary to resolve ambiguities, for example.

Figure 4:
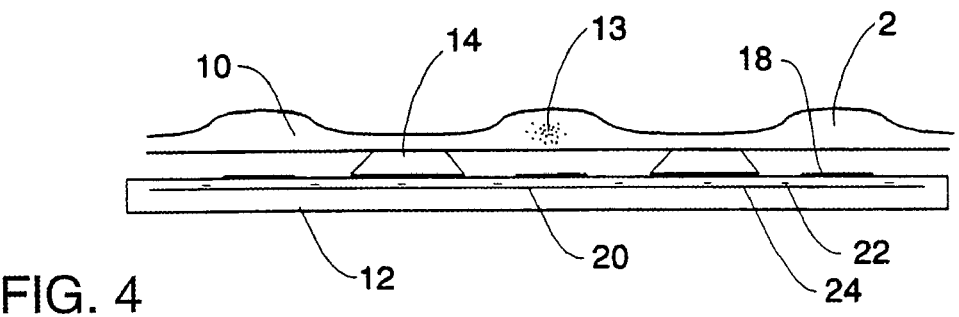
FIG. 4 shows a keypad with a doped cover rather than exposed pills.

In the keypad of FIG. 4, IACK element 10 has no conductive pills as in the embodiment of FIG. 1, but has instead been doped with a force-sensitive material 13, such as a conductive non-contacting particulate. For example, material 13 can be such as those that provide a quantum tunneling effect as developed by Peratech Limited of Darlington, County Durham, England.

Figure 5:
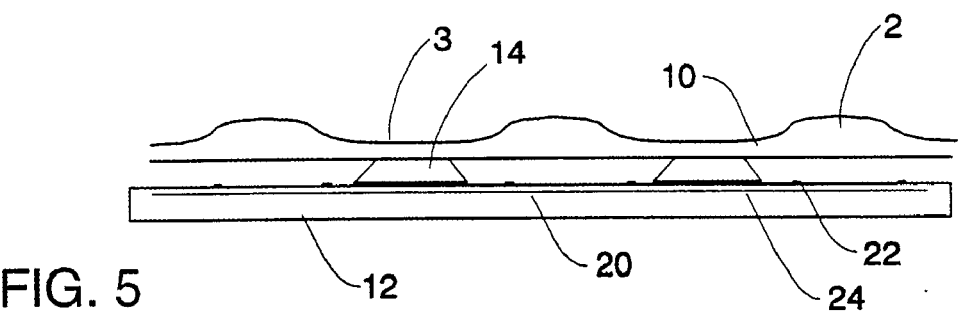
FIG. 5 shows a keypad without a traditional key switch matrix but with a location measuring grid.

In the embodiment of FIG. 5, an IACK keypad is implemented without a traditional key switch matrix. Location-measuring system 20 provides the function of both cursor control and keypad entry. The high degree of non-linearity of the capacitive measurement and ability of the device to both determine a maximum threshold for any given user and to determine the extent of the finger through measurements at proximate intersections allow this embodiment to operate without any distinct keypad switch matrix. As the finger approaches and thereby increases the magnitude of the capacitive measurement, the system determines the approximate size of the finger by comparing adjacent intersections, on a relative scale. This is to say that as the finger tracks across the keypad from one location to another, across several nodes, a range of high and low capacitive values is established on those occasions when the finger does not substantially change in elevation. This range is then compared to a reference, such as a look-up table on an absolute scale, establishing the size of the person's finger and thereby determining an appropriate capacitance measurement level that should be measured to recognize an intended input (e.g., a pressing of a key region, based on the location of the finger at the moment the appropriate intended input threshold is reached and the size of the finger.

Figure 6:
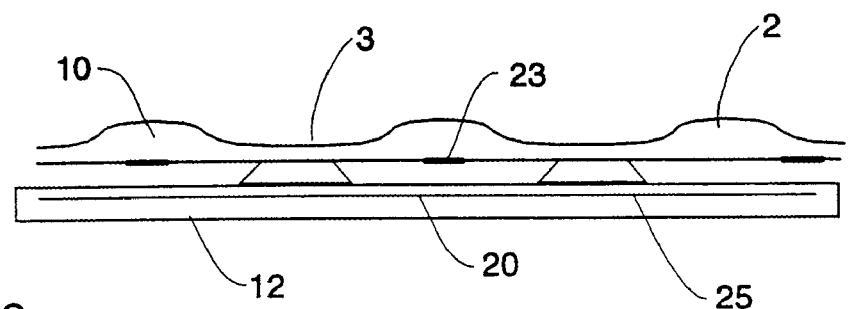
FIG. 6 shows a keypad with a location-measuring grid having one set of trace elements on the underside of the flexible cover and a set of perpendicular trace elements on the substrate.

In the embodiment of FIG. 6 the integrated horizontal array 25 is disposed within PCB 12 and the vertical array 23 is disposed, preferably printed in conductive ink, on the lower surface of IACK element 10. Horizontal array 25 may also be disposed at the surface of PCB 12 and covered with a thin non-conductive sheet of material, such as 0.010 inch of KAPTON (generically, polyimide), available from DUPONT. The embodiment of this figure advantageously increases the capacitive variation measured upon actuation of a key, with respect to the embodiment of FIG. 5. As a finger moves across the surface of IACK element 10 (without pressing keys) the device measures parasitic capacitance variations to provide coordinate location information. Pressing a desired character in keypad mode causes a much greater capacitance variation, because the traces of the capacitive array are displaced relative to each other. This high degree of capacitive change is of a different order than those measured by parasitic variation and thereby clearly indicates that a key actuation is intended. The system then registers the character identified by the parasitic variations measured just prior to the large, actuation-indicative variation. The two measurement systems are thus employed in concert to provide a particularly robust cursor control and keypad system. One of the additional advantages of this design is that it can be configured to need fewer microprocessor pins than a traditional keypad matrix, despite providing the additional functionality. For example, the number, placement and spacing of the traces of the array need not correspond with the key regions of the keypad in some embodiments, as illustrated by the placement of the rightmost element of array 23 in the figure. The spacing of the capacitance grid may be larger, for example, than the spacing of the adjacent independent key regions.

Figure 7A:
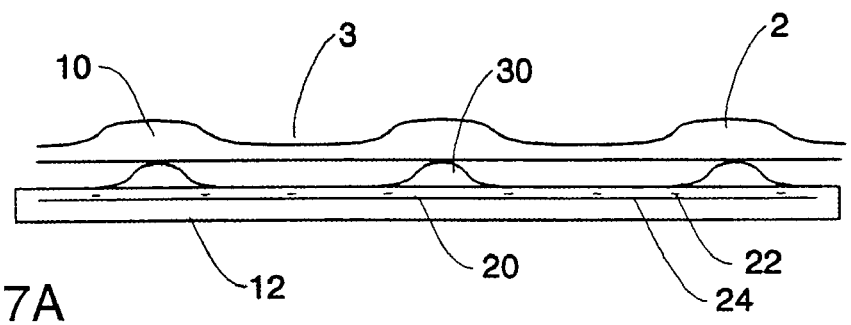
Figure 7B:
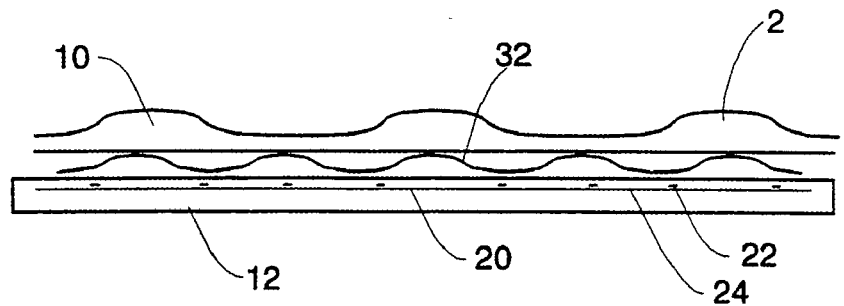
FIG. 7B shows a keypad with a single piezoelectric element between the cover and substrate.

FIG. 7A shows a keypad with snap elements formed by an array of high-deformation type piezoelectric devices 30 as disclosed in U.S. Pat. Nos. 5,781,646, 5,849,123 and 5,831,371, the contents of which are incorporated herein by reference. This embodiment can add energy to the device as a consequence of its use, and a high degree of tactile feedback. However, this embodiment can exhibit a plurality of tactile "clicks" associated with a single combination key output. FIG. 7B shows an array of devices 30 formed as a single piezoelectric element 32 disposed below the entire IACK element 10 and above location measuring system 20. This embodiment can provide several advantages, such as the ability to provide a single "click" for combination key input, as well as the ability to provide "call received" vibrations audible signals by appropriately activating displacement/voltage transducer element 32 as detailed in the prior art.

Figure 8:
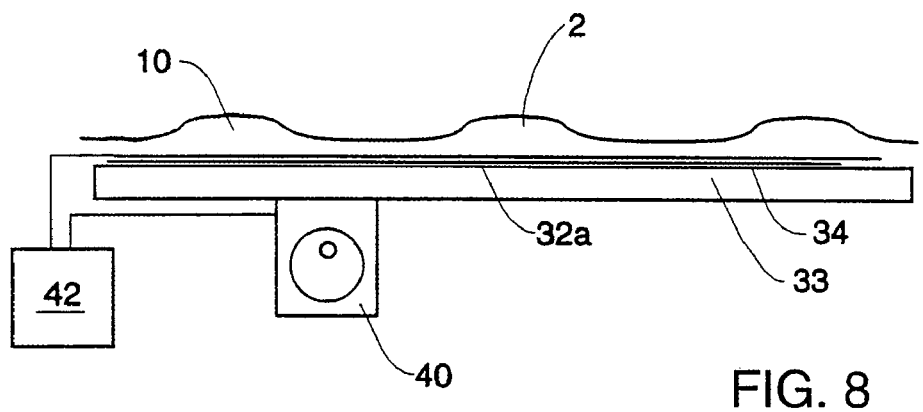
FIG. 8 shows a keypad with a force-sensitive resistor between the cover and substrate.

FIG. 8 shows a keypad with a force-sensitive resistor 32a, such as provided by Interlink of Camarillo, Calif., disposed between IACK element 10 and a mechanical backing 33. Snap elements maybe designed to be very readily collapsed, replaced by a bellows with a release valve at a predetermined pressure, or eliminated entirely as shown, because tactile feedback is provided by vibration element 40, which is actuated briefly by controller 42 to indicate that an output has been received from the keypad. The vibration element 40 shown is a vibratory motor, such as are commonly employed in telephones, pagers and the like, to indicate an incoming call or page.

FIG. 9 shows an IACK keypad PCB 12 with a single pair of electrical traces 69a and 69b providing contact for all of the switches in the matrix.

Figure 10:
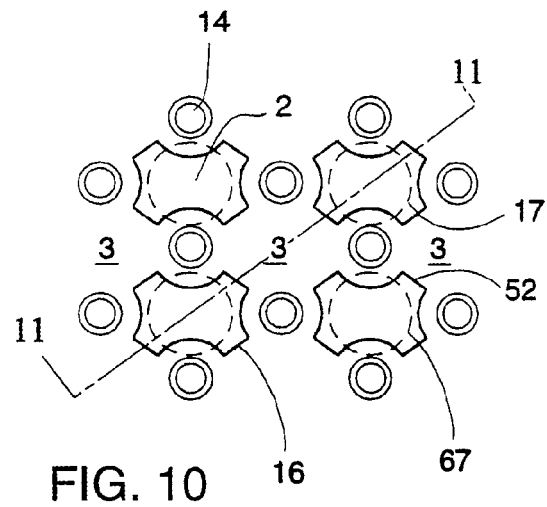
FIG. 10 shows the underside of an IACK keypad cover with a first conductive pill arrangement.
Figure 11:
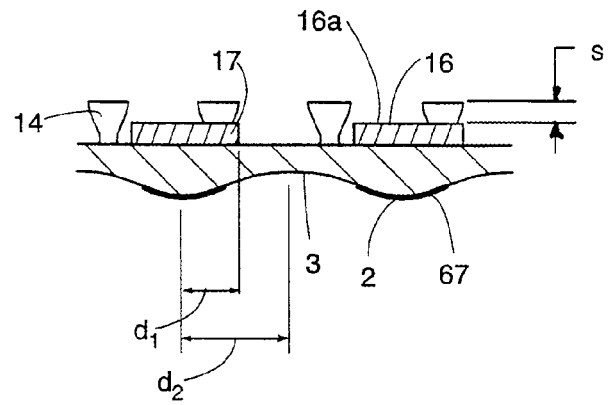
FIG. 11 is a cross-sectional view, taken along line 11-11 in FIG. 10.

Referring now to FIGS. 10 and 11, an IACK element is equipped with conductive pills 16 with flat outer contact surfaces 16a in the shape of crosses, with distal ends 52 of the arms 17 of the crosses extending toward associated combination key regions 3. Each pill 16 is positioned, for example, directly beneath an individual key region 2 of the keypad and extending over about distance $d_1$ of about 40 percent of the distance $d_2$ from the center of the conductive pill 16 to the center of the combination key region 3 toward which it extends. In this embodiment, each distal edge 52 is located approximately along segments connecting the centers of the most adjacent snap elements 14. The remaining edges of conductive pills 16 are preferably displaced at least one-half of a snap element stroke length 's' from each adjacent snap element 14, where 's' is defined as the vertical distance that snap elements 14 extend beyond conductive pills 16. Contact zones 67 are the area of the independent key regions that acts as a button during operation, in the sense that they transmit force from the operator's finger to deflect the keypad cover, and do not include area which only comes into incidental, non-loading contact with the operator's fingertip. Thus, contact zones 67 transmit substantially all (e.g., 90 percent of) the load applied by the operator during operation of a single independent key region. The relationship between contact zones 67 and preferred pill shape is explained with respect to FIGS. 20A and 20B. The exposed, upper surface of the keypad shown in FIG. 11 corresponds with the key region contour shown in FIG. 28.

Figure 12:
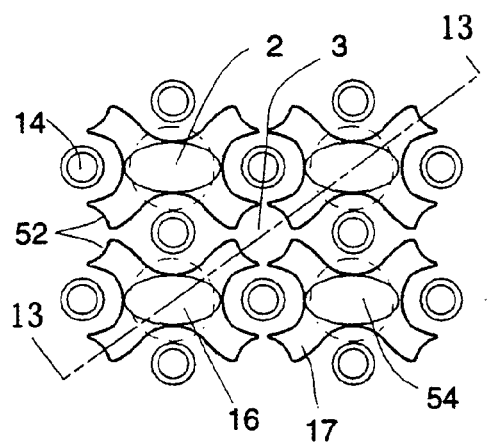
FIG. 12 shows the underside of an IACK keypad cover with a second conductive pill arrangement.
Figure 13:
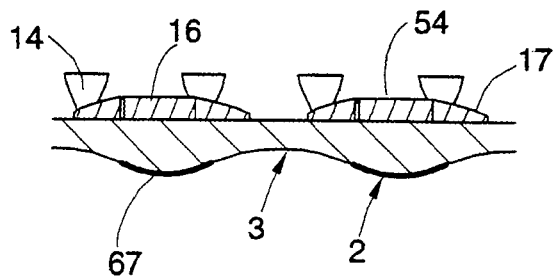
FIG. 13 is a cross-sectional view, taken along line 13-13 in FIG. 12.

FIGS. 12 and 13 illustrate a different configuration of conductive pills 16. In this embodiment, pills 16 each form an extended cross, with arms 17 of the cross extending toward combination key regions 3 further than shown in the embodiment of FIGS. 10 and 11. In this instance, arms 17 of the cross extend toward adjacent combination key regions 3 approximately 75 percent of the distance from the center of the conductive pills 16 to the center of the combination key regions 3, with distal arm edges 52 disposed beyond adjacent snap elements 14. This can be employed to significant advantage, as explained with respect to FIG. 20. Central area 54 of each pill is predominantly flat and parallel to the plane of the keypad, with arms 17 tapering at about 10 to 20 degrees with respect to this plane. The remaining edges of conductive pills 16 are displaced at least one-half of the stroke length from snap elements 14, where the stroke length is defined as discussed above with respect to FIG. 11.

Figure 14:
FIG. 14 is an end view of a solid sheet of material from which conductive pills may be stamped.
Figure 18:
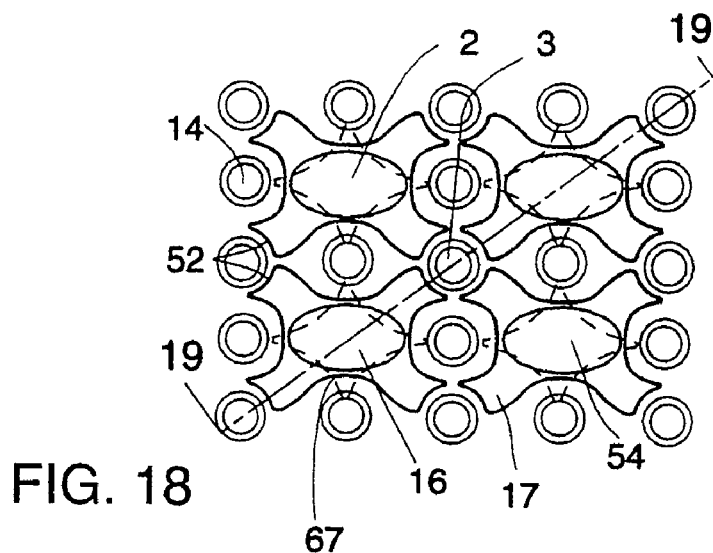
FIG. 18 shows the underside of an IACK keypad cover with a fourth conductive pill arrangement.

FIG. 14 shows an end view of a sheet 58 of a solid conductive material from which the conductive pills 16 of FIGS. 12 and 18 may be stamped, as an alternative to printing the surface of a molded IACK element 10 with conductive ink. Sheets 58 of carbon-doped foamed or elastomeric material, or material otherwise rendered conductive, are extruded or otherwise molded such that one or more cross-sections have an undulating surface as shown. Individual pills 16 are then stamped or punched from such a sheet. Symmetry of the stamped pills can enable the pills to be oriented either up or down during manufacture, with the elastomeric material conforming as needed to accommodate, thereby easing the manufacturing process.

Figure 15:
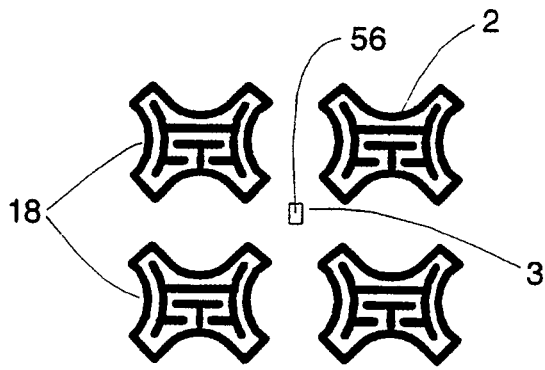
FIG. 15 illustrates switch grid pads configured for use with the cover of FIG. 12.

FIG. 15 illustrates switch grid pads 18 configured for use with the conductive pills 16 of the embodiment of FIG. 12, with light emitting diodes 56 placed in combination key regions 3 between the grid pads.

Figure 16:
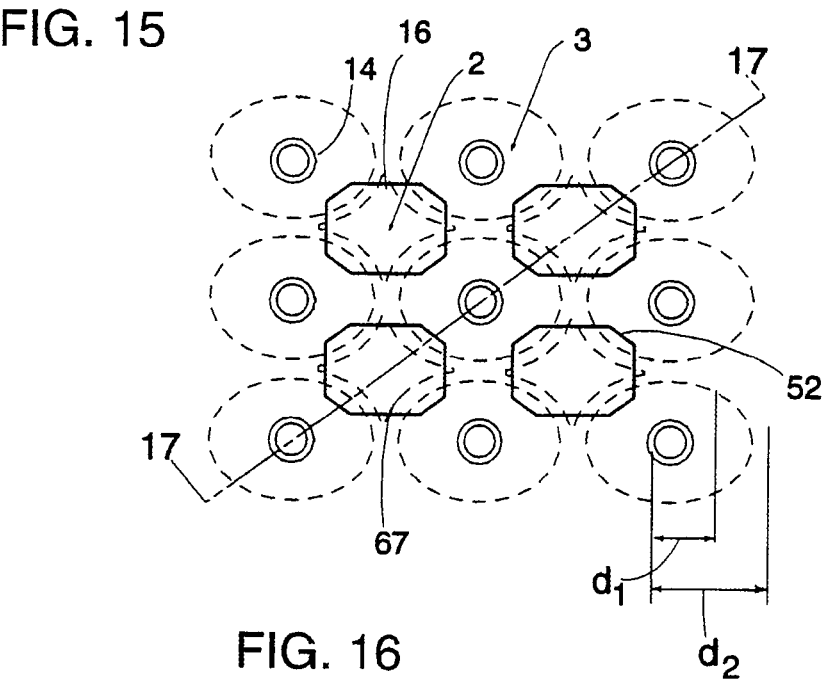
FIG. 16 shows the underside of an IACK keypad cover with a third conductive pill arrangement.
Figure 17:
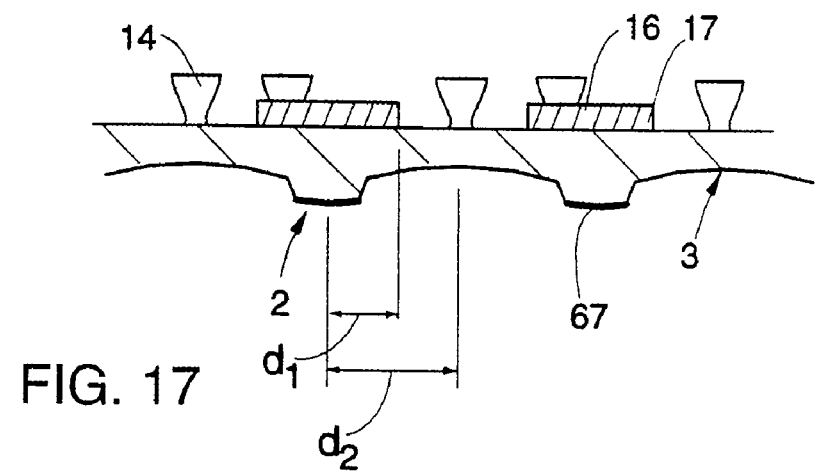
FIG. 17 is a cross-sectional view, taken along line 17-17 in FIG. 16.
Figure 29:
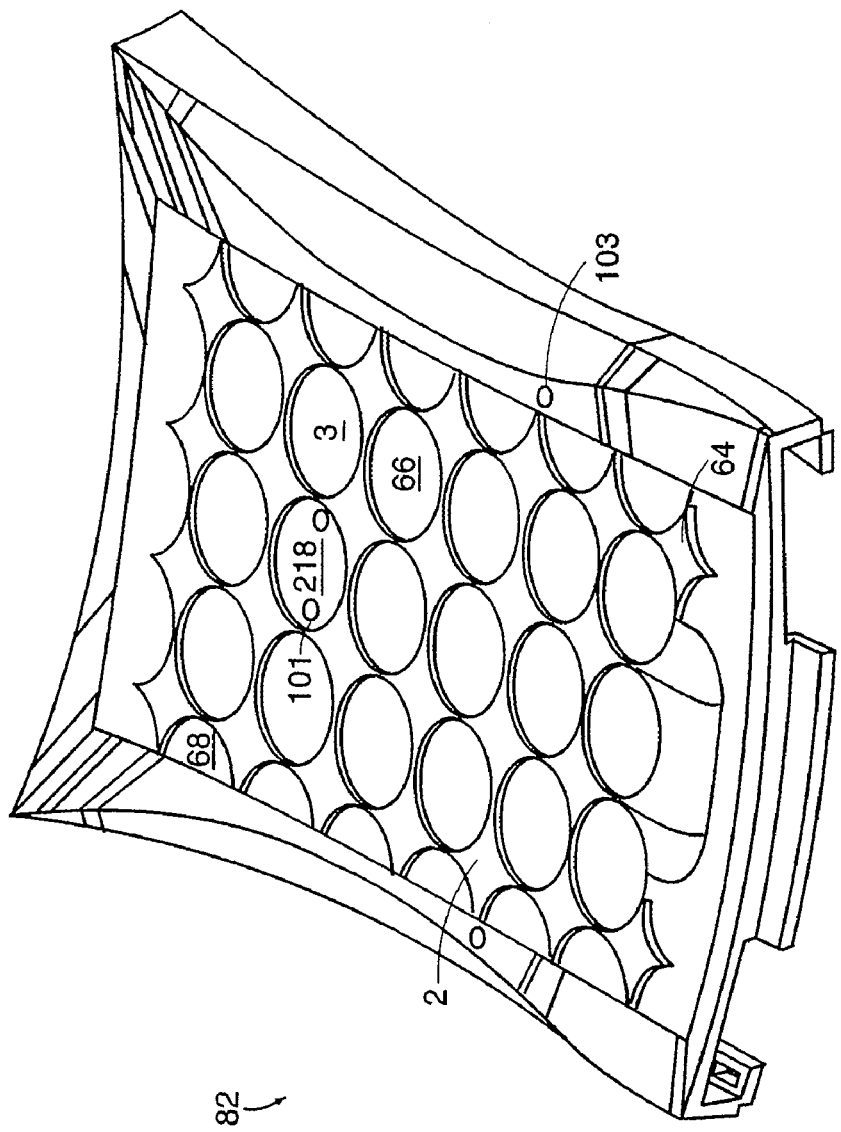
FIGS. 29 and 30 are perspective and face views, respectively, of another IACK keypad surface.

Referring now to FIGS. 16 and 17, an IACK element 10 has snap element 14 located under combination key regions 3. Conductive pills 16 are shown below independent regions 2. In this example the top surface of the keypad is as shown in FIG. 29. Preferably, distal corners 52 should present a flat edge to the combination key area 3. In this embodiment, a rectangular shape with chamfered corners has been selected. Each pill 16 is positioned, for example, directly beneath an individual key region 2 of the keypad and extending over about distance $d_1$ of about 40 percent of the distance $d_2$ from the center of the conductive pill 16 to the center of the combination key region 3 toward which it extends, on a line connecting adjacent key region centers. The exposed, upper surface of the keypad shown in FIG. 17 corresponds with the key region contour shown in FIG. 29.

Analogous to FIGS. 12 and 13, FIGS. 18 and 19 show the pills 16 extending farther toward the center of combination region 3, but with the peripheral regions of the pill sloped away from the PCB 12. In this case pills 16 are shown with a flat, horizontal central area 54, but the entire contact surface of the pill 16 is, in other embodiments (not shown), sloped or curved to produce the desired result. Snap elements 14 are as described above.

Figure 20A:
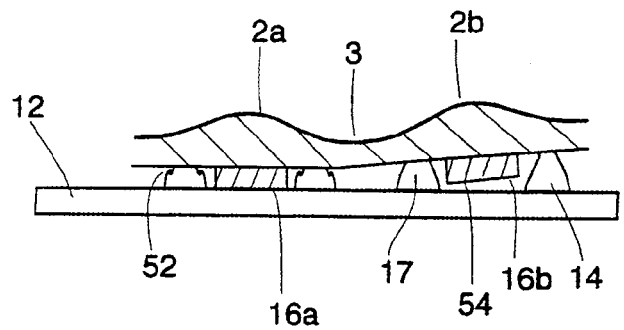
FIGS. 20A and 20B illustrate the deflection of the keypad covers of FIGS. 17 and 19, respectively.
Figure 20B:
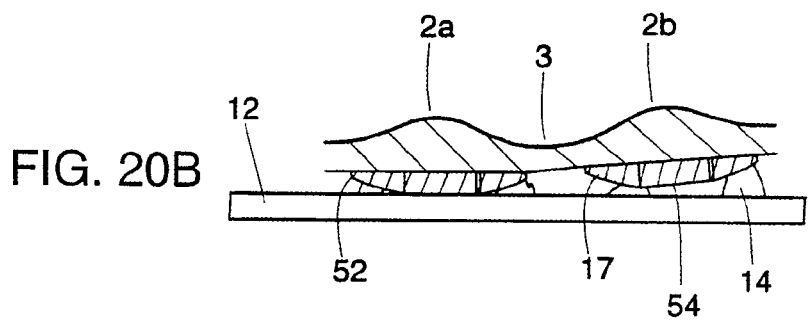

FIGS. 20A and 20B illustrate the deflection of the keypad cover to cause a pill 16a associated with a depressed key region 2a to make contact with PCB 12, while an adjacent pill 16b associated with another key region 2b tilts slightly with respect to the PCB but does not make contact. As in the proceeding figures, the cross sections are taken along the major axis of the pills. The pills of FIG. 20A are as in the embodiment of FIGS. 10 and 16, while the pills of FIG. 20B are sloped as in the embodiment of FIGS. 12 and 18. If the user wants the character printed on key region 2a, she needs to cause pill 16a to contact PCB 12; if she wants the character printed on key region 2b, she needs pill 16b to contact; and if she wants the character printed on the combination key region 3 between them, she needs both pills 16a and 16b to make meaningful engagement with the PCB. In both examples independent key region 2b has been slightly deflected, partially because of necessary entrainment due to bending of the common membrane forming them, and partly due to inaccuracies inherent in normal use. Therefore, if the facing edges of the pills spanning a combination key region are too far apart, it is possible for very small fingertips to deflect the surface of the keypad corresponding to the combination key region without engaging both pills and therefore not registering the desired combination key input. Conversely, if the facing edges of the pills between two directly adjacent independent key regions are too close together, then the user may accidentally cause an adjacent independent key to strike when depressing only a single independent key region, registering a combination key input in error. The illustrated embodiments solve this dilemma by making the pills effectively both large and small. By sloping the distal regions of the contact surfaces of the pills, as in FIG. 20B, they may be made larger and therefore provide reliable operation with both small and large fingers. This improvement also helps to enable independent key regions 2 to be made relatively small, while allowing the pills to remain relatively large.

Figure 21:
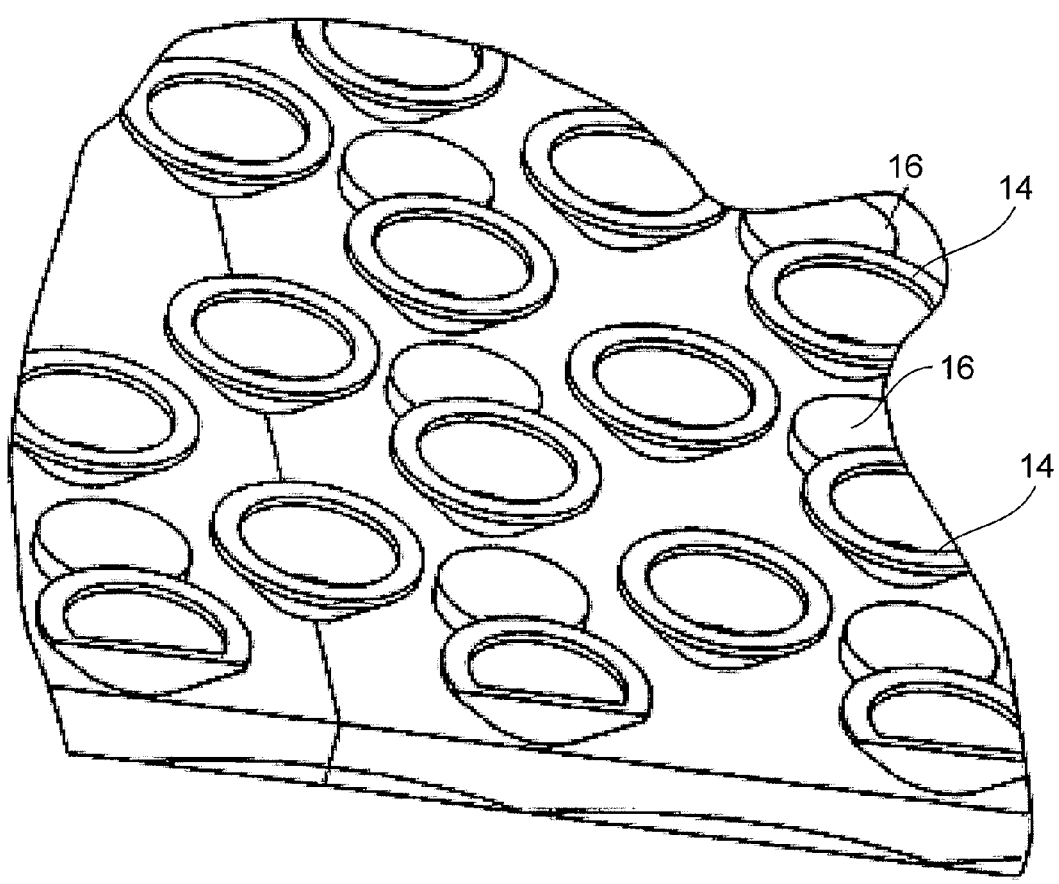
FIG. 21 is a partial perspective view of the underside of an IACK keypad cover.

FIG. 21 illustrates a two-dimensional array of equally spaced snap elements 14, each positioned approximately midway between the conductive pills 16 associated with two adjacent individual key regions 2. In this embodiment, snap elements 14 are frustoconical, but it should be understood that variations to this specific shape will provide approximately the same non-linear buckling effect. Snap elements 14 form a staggered array, with each interstice between snap elements containing either a pill 16 associated with an individual key region 2, or an empty space associated with a combination key region. Each individual and combination key region (i.e., each snap element interstice) is equally configured with respect to the number of adjacent snap elements and their proximity, such that the user experiences a similar tactile response from both individual and combination key actuations as an equal number of snap elements 14 are compressed during operation of either. Pills 16 are shown as circular pucks in this illustration, but can be of the other shapes described above.

Figure 22:
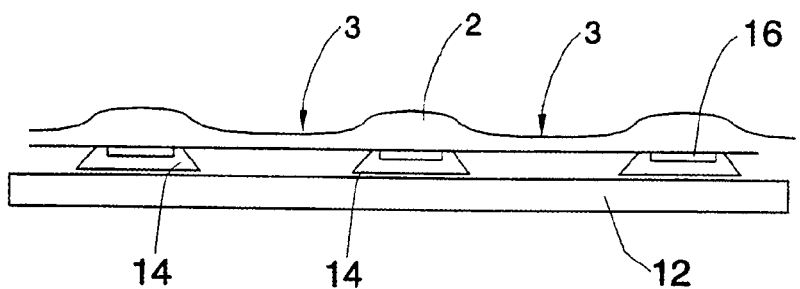
FIG. 22 shows a keypad with pills placed directly beneath independent key regions.

With the embodiment of FIG. 22, by contrast, tactile feedback for each combination key region 3 is provided by four, equally spaced, adjacent snap elements, while tactile feedback for each individual key is provided essentially by a single associated snap element 14 located directly beneath the individual key region 2. Each snap element 14 surrounds an associated conductive pill 16. This arrangement can be configured to provide a combination key actuation force of up to four times greater than individual key actuation force, if such is desired for a particular application. For many applications, however, it will be desirable to provide all key regions with a similar tactile feedback response, as is provided by the embodiment of FIGS. 2 and 21, for example, in which snap elements 14 are each disposed approximately equidistant between two adjacent individual key switches. In this case, snap elements 14 can be cross-shaped.

Figure 23:
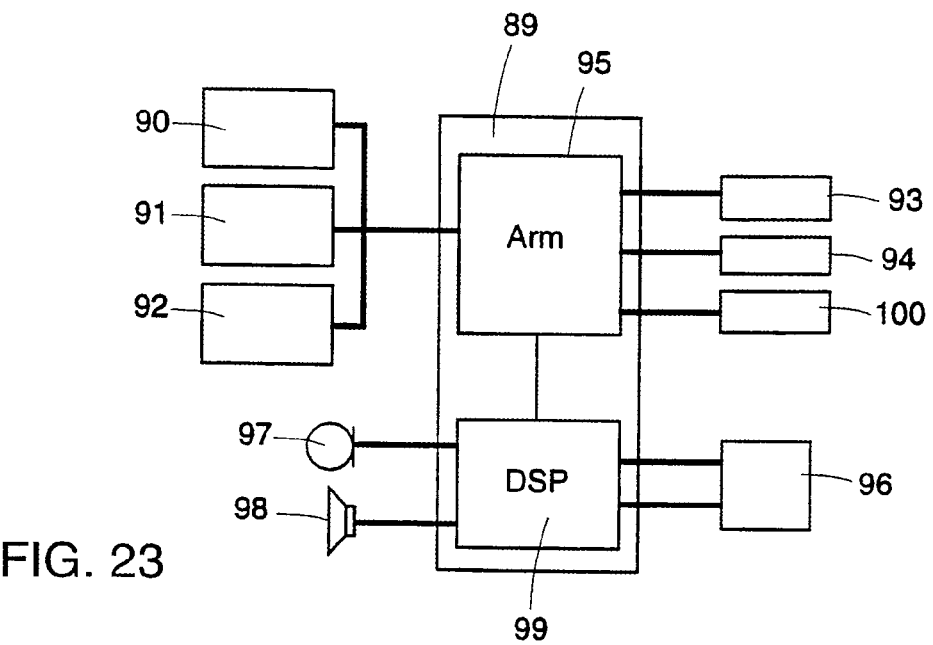
FIG. 23 is a schematic representation of a telephone electronic circuit.

FIG. 23 shows a schematic of a mobile telephone control circuit for performing the functions of a mobile phone, including those keypad control algorithms disclosed herein. At its core is a telephone processor 89, such as a chip ML20xx, available from Mobile Link of Santa Clara, Calif. Flash memory 90, static random access memory 91 and liquid crystal display 92 are connected through a bus to an ARM RISC (Reduced Instruction Set Computer) processor 95 of chip 89 that provides user interface and protocol processing. Direct lines connect the system connector 93, SIM (Subscriber Identity Module) 94 and the keypad 100. An Oak digital signal processor (DSP) 99, also located on chip 89, provides the physical layer for processing speech through a microphone 97 and speaker 98 where it is transmitted and received by dual band RF unit 96.

Figure 24:
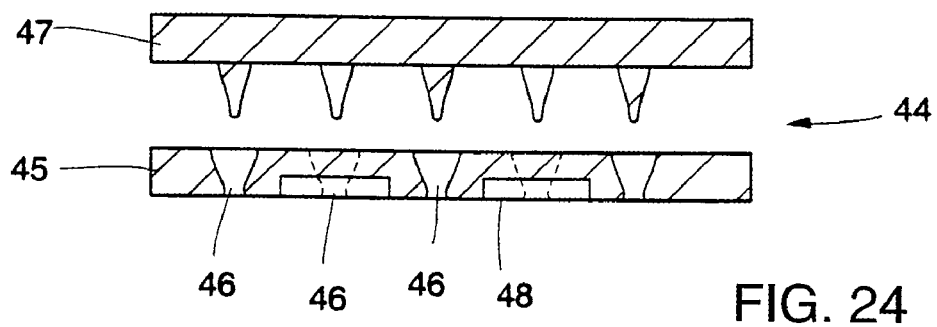
FIG. 24 is a cross-sectional view of a two-part mold for molding the underside surface of the keypad cover of FIG. 21.

Referring now to FIG. 24, a mold half 44 for forming the underside of an IACK element with integrally molded snap elements such as the ones shown in FIG. 14, consists of a fixed plate 45 that defines cavities 46 for molding the outer surfaces of each snap element, and a moving plate 47 with roughly conical projections 48 that form the inner surfaces of the snap elements. The two mold plates are held together as the resin is introduced and cooled, and then separated to enable removal of the molded snap elements from cavities 46. Cavities 48 are also provided in plate 45 for holding conductive pills as inserts during molding. Moving plate 47 and fixed plate 45 may be permanently joined if the cross-sections through cavities 46 perpendicular to resin flow decrease in area toward the ends of the cavities, enabling pulling of the molded snap elements from their cavities without separating the mold halves.

Figure 25:
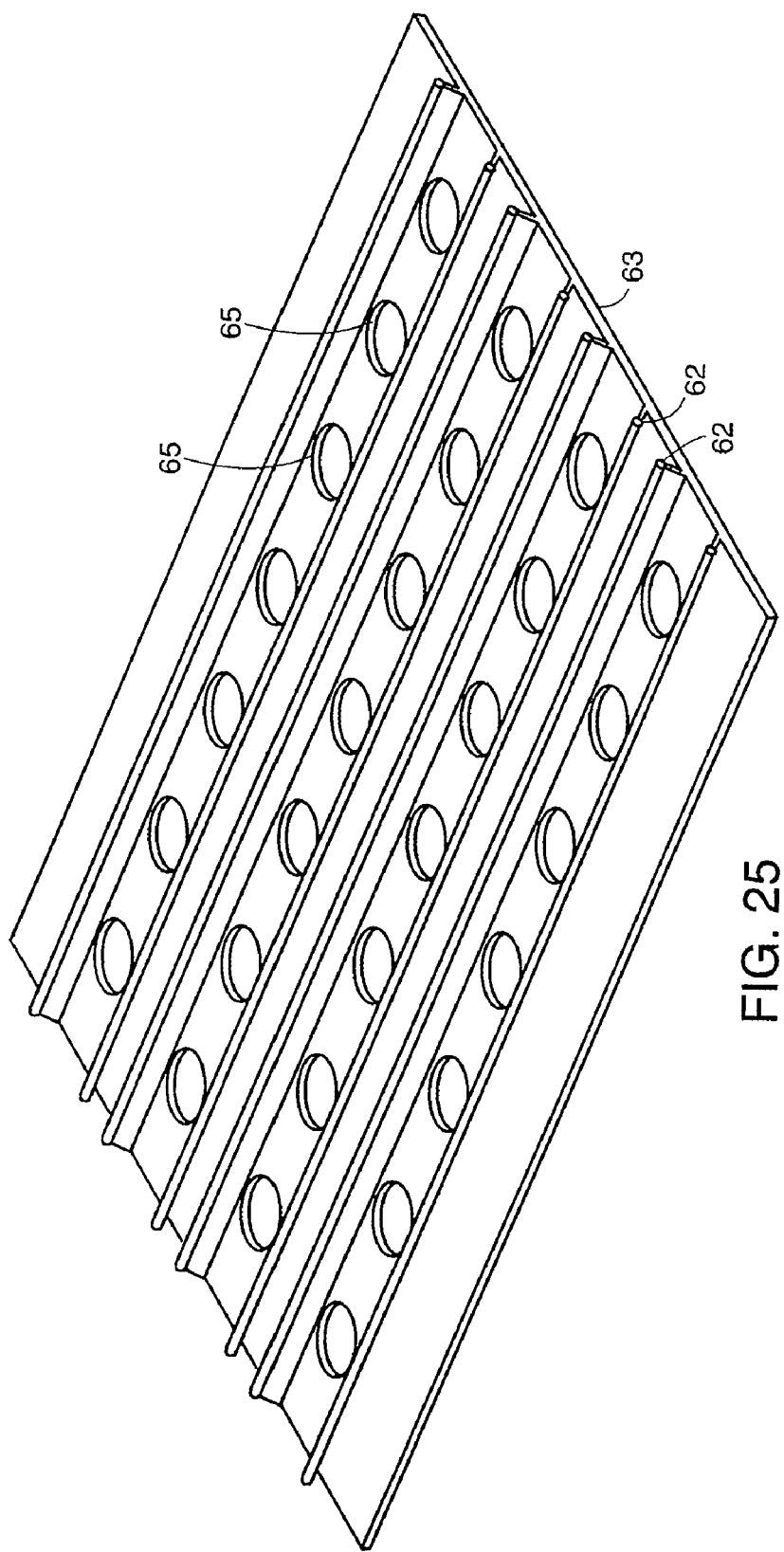
FIG. 25 is a perspective view of a first tactile feedback sheet for use under a keypad cover.

FIG. 25 shows a tactile feedback structure for an IACK keypad having an array of linear rails 62 molded with a common base sheet 63 and extending at an angle of approximately 60 degrees with respect to the base sheet. Alternatively, rails 62 may be coiled or curved to meander across the face of sheet 63 like a snake. This embodiment provides non-linear tactile keypad feedback over the entire surface of an IACK keypad. An adhesive may be used to affix the sheet to the printed circuit board, with holes 65 providing clearance for pills of the keypad to contact the PCB. Or, rails 62 may be integrally molded, complete or in sections, with the underside of an elastomeric keypad cover. Adhering the distal ends of the rails to the opposing surface (of the keypad cover or PCB) prevents deformation of the center of the IACK keypad under ranges of temperature and humidity and also provides a stable reference to the distal ends of the feedback elements.

Figure 26:
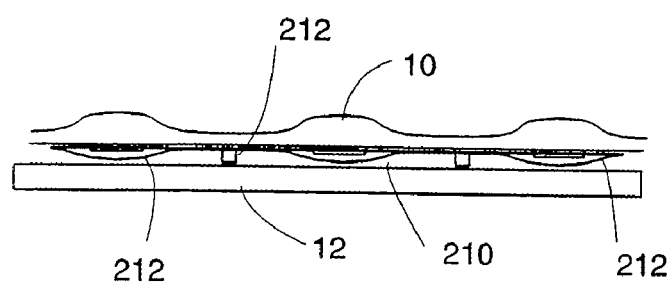
FIG. 26 shows a keypad with a second tactile feedback sheet.
Figure 27:
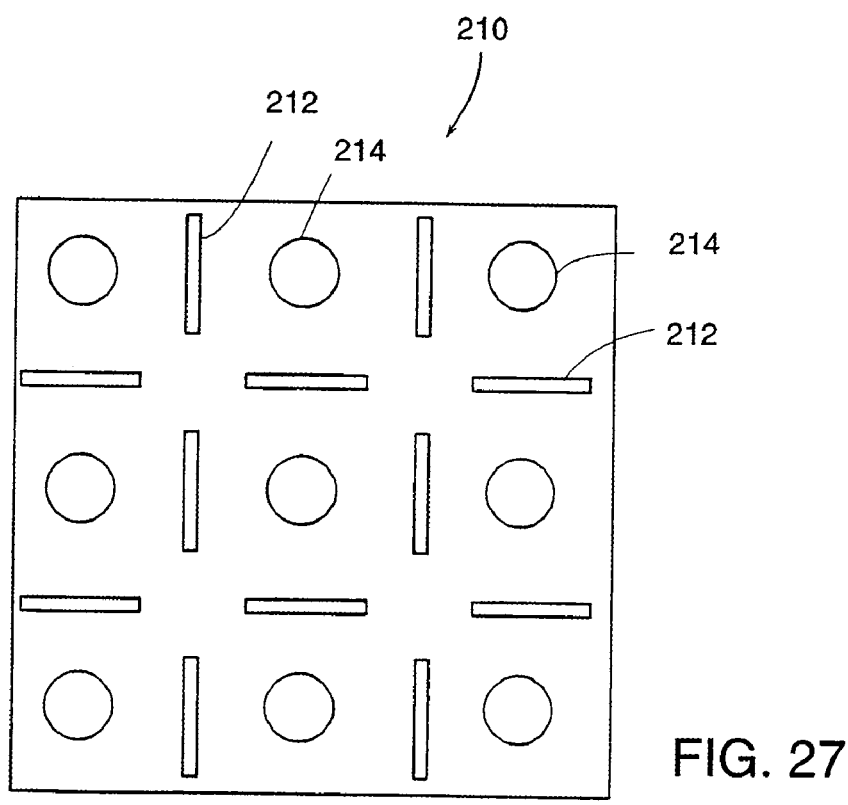
FIG. 27 is a face view of the feedback sheet of FIG. 26.

FIG. 26 shows a side view of a keypad with a tactile feedback element 210 in the form a stamped metallic sheet placed between cover 10 and PCB 12. Sheet 210 is stamped to form arched segments 212 extending out of its plane to form snap elements. In this embodiment, the back side of the sheet is in face-to-face contact with the back of the IACK element 10, with the distal portions of the arched segments adjacent the PCB 12. As shown in FIG. 27, arched segments 212 are arranged in rows and columns between stamped apertures 214 that provide access of the conductive pills 16 to the PCB 12.

Figure 28:
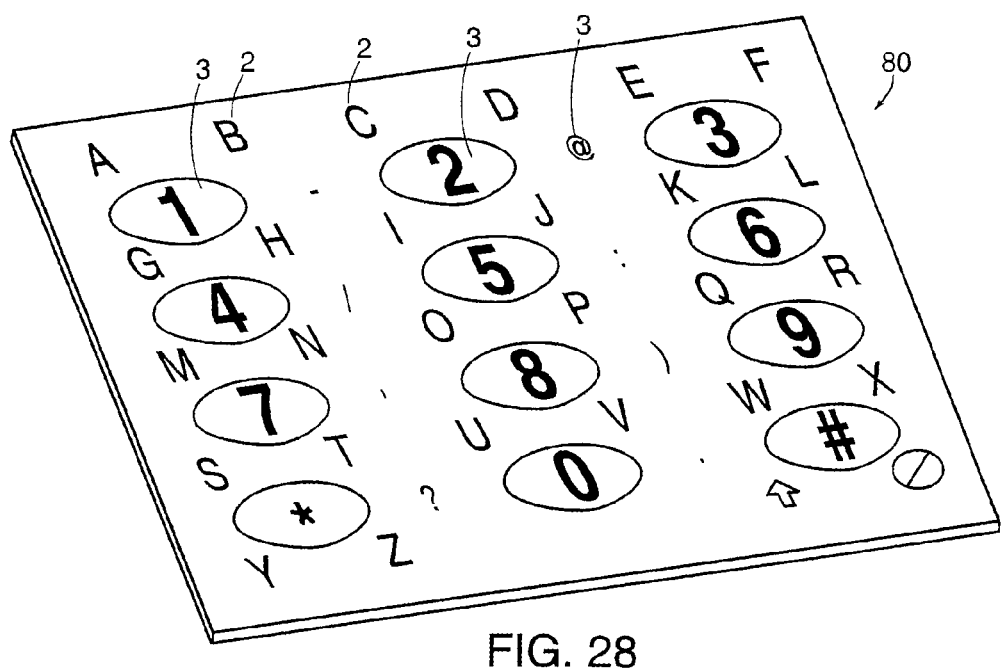
FIG. 28 is a perspective view of a smoothly contoured IACK keypad surface.

Referring next to FIG. 28, ergonomically friendly IACK keypad 80 has a continuously undulating surface, and markedly does not present combination key regions 3 as being at visible interstices of independent key regions 2. Instead, combination key regions 3 appear as completely independent entities (although they remain interstitial in function). There are no visible features extending into the visible combination key regions 3 to indicate any relationship to the layout of independent key regions. In this example, combination key regions 3 are smoothly contoured, visibly bounded oval regions, each bearing a centrally located legend. Individual key regions 2 are not delineated, thereby providing a visually clean and simplified context for increased legibility, and the traditional telephone key layout is created through use of predominantly graphical elements. The graphical elements may be slightly depressed and/or produced with a "two-shot" molding process in which the elements that define the combination key regions 3 (or of the traditional telephone key layout alone) are molded first in one color, with the balance of the keypad molded in a second color.

Figure 19:
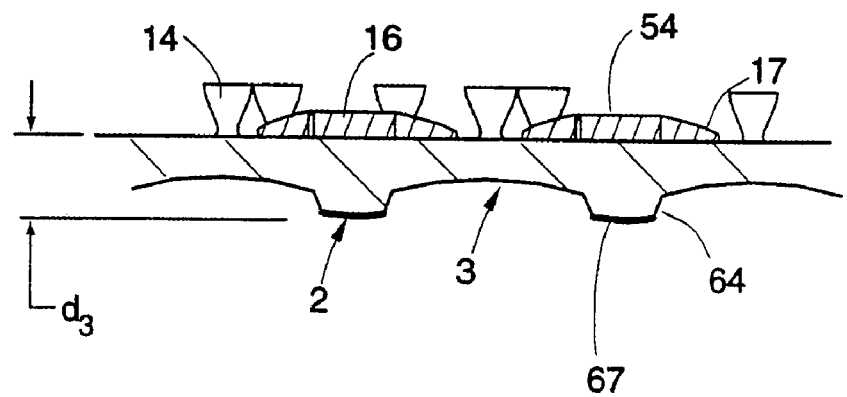
FIG. 19 is a cross-sectional view, taken along line 19-19 in FIG. 18.

FIG. 29 shows an IACK keypad 82 in which combination key regions 3 have been maximized as circular or oval regions, and the independent key regions 2 consist of diamond shapes 64 disposed in voids between them. As in FIG. 28, this embodiment does not present combination key regions as the intersections of independent keys. Instead, the combination key regions appear to be independent entities. The expanded circular or oval regions associated with combination key regions 3 are depressed in a bowl-like shape by approximately 0.10 to 0.50 millimeter at their centers, as measured from a neutral plane defined relatively sharp transitions at their edges. Referring also to FIG. 19, the elevated portions are diamond-shaped nubs 64, extends above the neutral plane by approximately 0.30 to 1.0 millimeter. Thus, the overall distance $d_3$ from the top of diamond-shaped nubs 64 to the bottom of the circular or oval regions representing the combination key regions 3 is approximately 0.70 to 1.5 millimeters. The tops of nubs 64 are predominantly flat, with slight curvatures. Combination key region 218 is equipped with a pair of tactile locating nubs 101, such as are employed to indicate the number "5" on many standard keypads. In addition, two additional locating nubs 103 are located just outside the keypad grid, between the fourth and fifth rows of combination key regions (i.e., aligned with the fifth independent key region row) as counted from the far end of the keypad. These locator nubs can be located by touch to assist in use of the keypad in the dark, or by the vision impaired.

Figure 30:
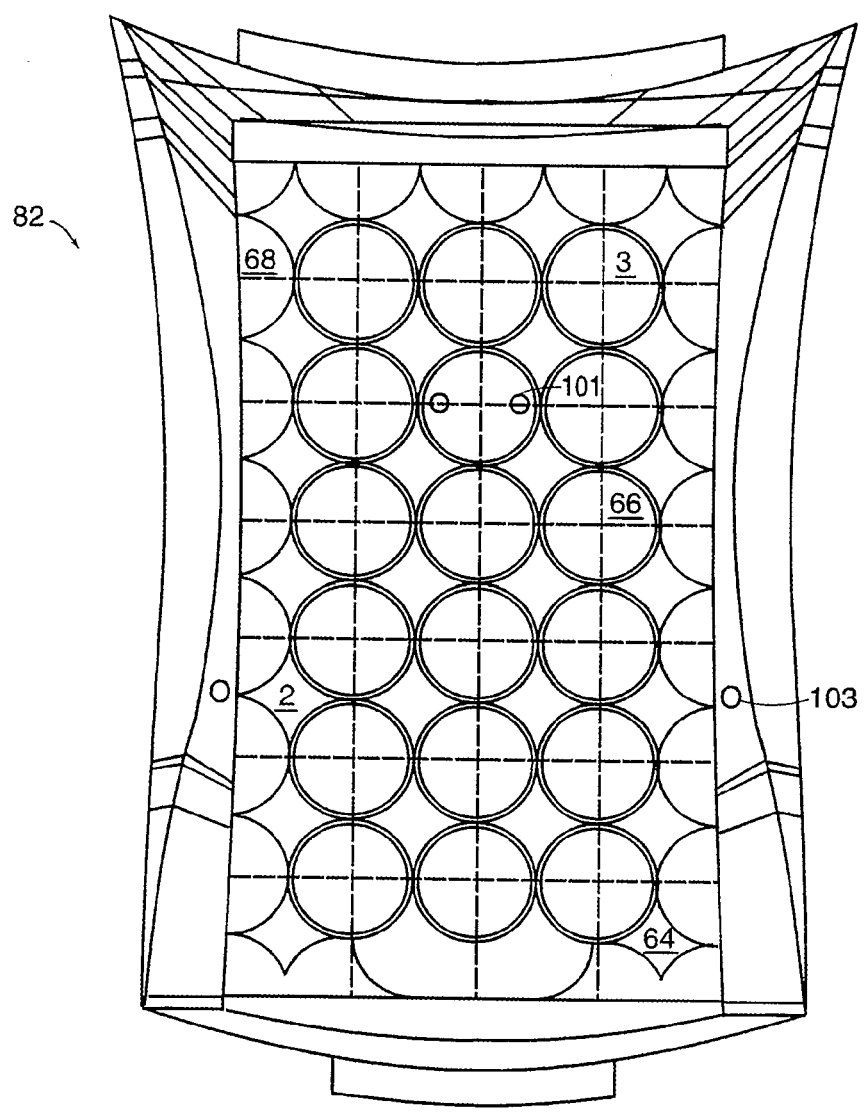

FIG. 30 also shows, in dashed outline, the underlying grid associated with the independent keys as determined by the switch matrix beneath the keypad cover, to show that the exposed surface is void of delineations of this functional grid, as viewed by an operator. Instead, the cover surface appears as a matrix of independent and combination key regions, as defined by delineations or sensible features not aligned with the underlying grid.

Figure 31:
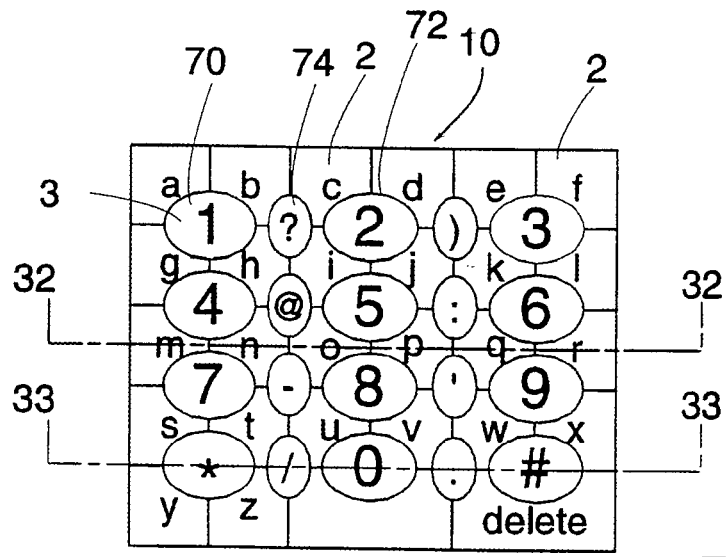
FIG. 31 shows a preferred layout for an alphanumeric IACK keypad for a telephone.
Figure 32:
FIGS. 32 and 33 are cross-sectional views, taken along lines 32-32 and 33-33, respectively, of FIG. 31.
Figure 33:
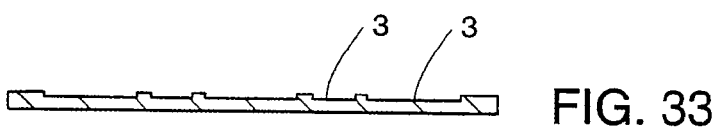

FIGS. 31-33 show an IACK element 10 with a traditional telephone layout formed by numerical columns of combination key regions 3. The first numerical column 70 (with 1, 4, 7,*) is separated from the second numerical column 72 (with 2, 5, 8, 0) by a column of unrelated characters 74 (here shown with punctuation symbols '?', '@', '-' and '/'). This pattern is repeated, with a second punctuation column of characters ')', ':', '"' and '.' between the second and third numerical columns. The widths of the legend areas of adjacent combination key columns (e.g. 70 and 74) are different in size, varying from wide (column 70) and narrow (column 74). A cross-section through directly adjacent independent key regions 2 (FIG. 32) shows a regular key region spacing, while a cross-section through directly adjacent combination key regions 3 (FIG. 33) shows alternating key region widths.

Preferably, the width 'X' of the space between directly adjacent independent keys 2 is about half the width of a human finger or less, and the coloration of the legend regions used to identify the characters of the columns alternate, such as in contrast from dark to light.

Figure 34:
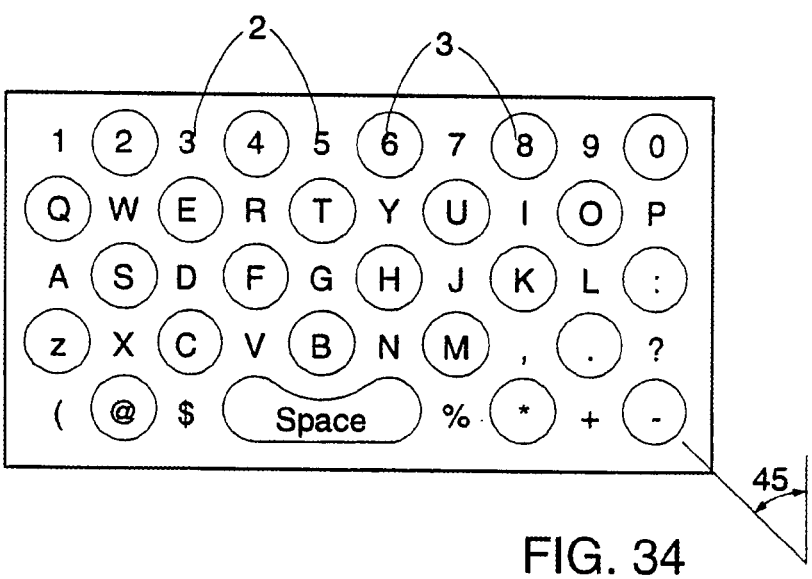
FIG. 34 is a layout of a QWERTY keypad, with columns of independent keys arranged diagonally.

FIG. 34 shows an IACK keypad with columns of independent key regions 2 and columns of combination key regions 3 disposed along a 45-degree bias with respect to the user (i.e., with respect to a normal keypad orientation as defined by legend orientation). This embodiment increases the number of independently actuatable keys that may be disposed in a horizontal line (as defined by normal keypad orientation) by approximately 40 percent over some earlier IACK keypad implementations, thereby significantly reducing the width of a keyed product, especially the traditional QWERTY layout shown.

Figure 35:
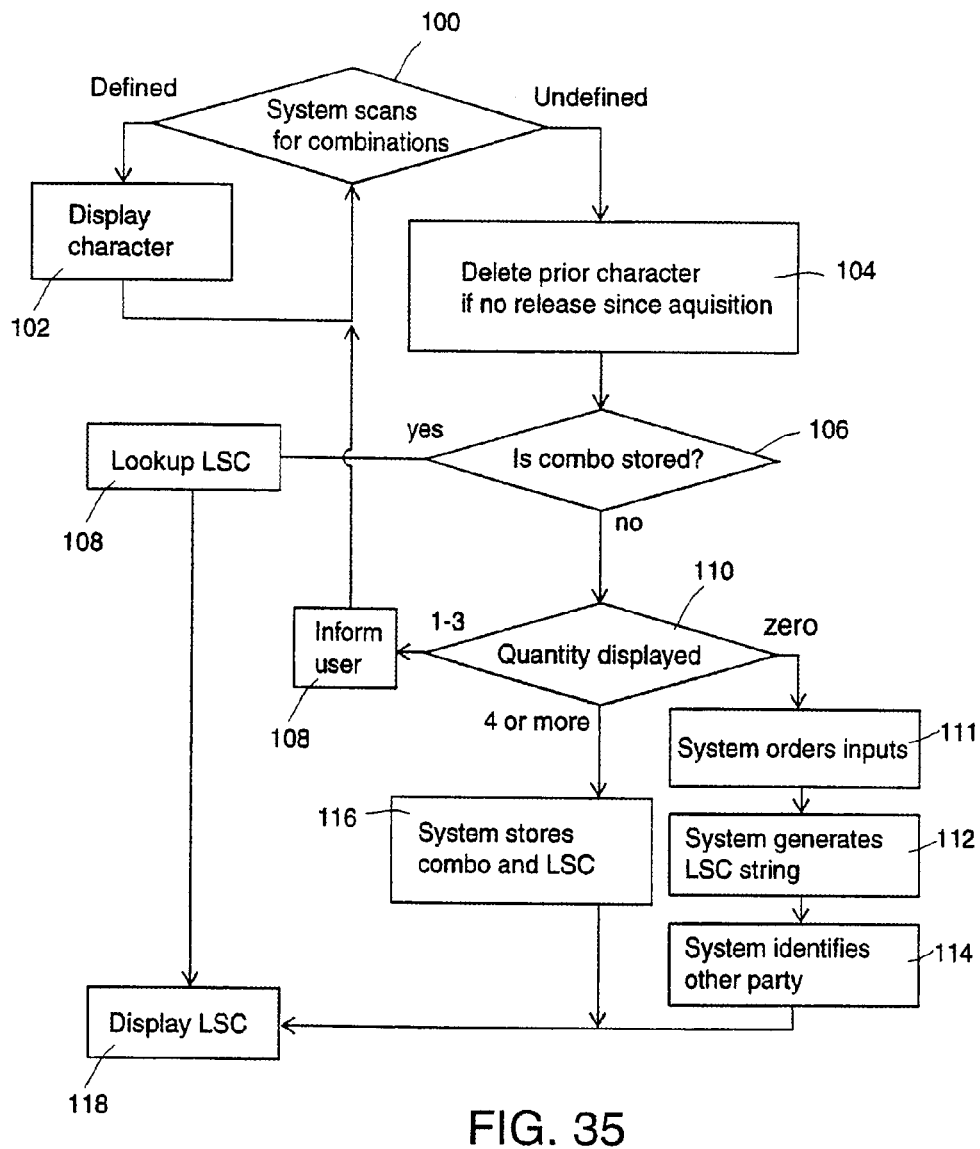
FIG. 35 illustrates an algorithm for storing and recognizing combination inputs.

FIG. 35 shows an improved method for interpreting input in the form of a long string of characters (LSC), such as a phone number, security code, Personal Identification Number (PIN; an access code used to identify an individual prior to a system providing access or service) or the like, taking advantage of the ability of the IACK keypads disclosed above to detect simultaneous input from any combination of independent key regions, even non-adjacent ones. This method can be advantageous for providing a secure, yet fast, means to enter numeric codes, for applications such as providing access to web sites and other phone-based services and content; entering one's own telephone number followed by a PIN as a means to access voice mail; and the like. These algorithms, referred to as the LSC function, can be adapted to simultaneously satisfy the following needs: 1) create a sufficiently complex input to provide a reasonable level of security; 2) satisfy the minimal requirements of PIN access codes in a wide variety of applications; and 3) allow near-instantaneous input of LSCs, whether user-defined or system defined.

In step 100 the system scans the keypad electronics for an indication that two or more independent keys are engaged at any particular time. In step 102 the system displays a character as the consequence of the system identifying a defined combination key corresponding to the sensed combination, such as on a local display. Preferably, the user need not perform any separate task to access LSC functionality; simply engaging an undefined combination of at least two unrelated independent keys for a predetermined period of time prompts the system to access the LSC functionality. If the system detects an undefined combination, the system proceeds to step 104. In the event that the system had just previously registered an individual or combination key prior to identifying an undefined combination and a "keyup" is not registered (i.e., the operator has not stopped pressing the keypad), the system deletes the previously entered character.

In step 106 the system determines if the undefined combination corresponds to a stored LSC. If previously stored, then the system posts the associated LSC to the display in step 108. If the undefined combination has not been previously stored as corresponding to an LSC, the system determines in step 110 how many characters were registered on the display when the undefined combination was sensed. If characters are registered, but too few to be a valid PIN number (for example, one to three), then the system informs the user that PINs must be at least four characters long and continues to scan the keypad in step 100.

If there are no characters on the display, then the system proceeds to generate a pseudo-random LSC based on the inputs provided. In step 111 the system orders the independent key inputs (in this embodiment, combination keys are not read as they are when establishing defined combinations) into a predetermined order that is independent of the order in which the individual key inputs were sensed. One such order would be alphabetical. Another (which encompassed punctuation symbols) is to sort by ASCII value. This ordering is likely to change the order in which keys were acquired by the system. In step 112 the system generates an LSC string, preferably all-numeric and at least 8 characters long. If a simple concatenation of the ASCII values results in too short an LSC, the values can be added together and the result appended. There are numerous ways to generate an appropriate, psuedo-random numeric sequence from a set of inputs. If the result is too long, it may be truncated.

In optional step 114 (useful if a phone call is in process, for example), the system determines the identity of the other party by checking caller ID or simply looking up the identity of the other party in a stored address book. If, in step 110, it is determined that the user has already entered a significant LSC into the display, (in this example four or more) then the system stores that undefined combination into memory so that the associated LSC may be provided by step 108 in the future. In step 118 the LSC, whether defined by the user or the system, is posted to the display 92. In the case of a system-defined LSC, it may post a reference identifier, such as "PIN#3", or (if step 114 has been implemented) a party-specific identifier, such as "Bank X PIN."

FIG. 36 shows an algorithm, embedded in a telephone, that provides a reverse mapping from inputs of alphabetic keys to numeric key outputs as dictated by the correlation of the standard 12 key telephone pad (i.e., standard telephone keypad letter-number correspondence, as shown in FIG. 37) that simplifies the task of dialing telephone numbers provided in an alphanumeric format, such as "1-800-PATENTS." Such numbers have long-been frustrating for while they are easy to remember, they are hard to dial. However, reverse mapping has special applicability to IACK keypads because while they provide a telephone keypad, in many instances they do not provide a correlation between alpha and numeric characters.

In step 120 the user inputs alphanumeric data into the telephone. This may be done with a traditional keypad, an IACK keypad, or orally. In step 122 the user signals the desire to "dial" a telephone number by pressing a key or by speaking a pre-designated word. Steps 120 and 122 may be transposed, especially in the oral case. In steps 124 and 126, in either order, the telephone passes numbers through without modification, while re-mapping the alpha characters by the standard alphanumeric telephone correlation shown in FIG. 37. For example, when any one of the letters "A", "B", or "C" is pressed, the output is the number "2." In step 128, the output from the algorithm is purely numeric, consisting entirely of combinations of the numerals 0-9.

Figure 38:
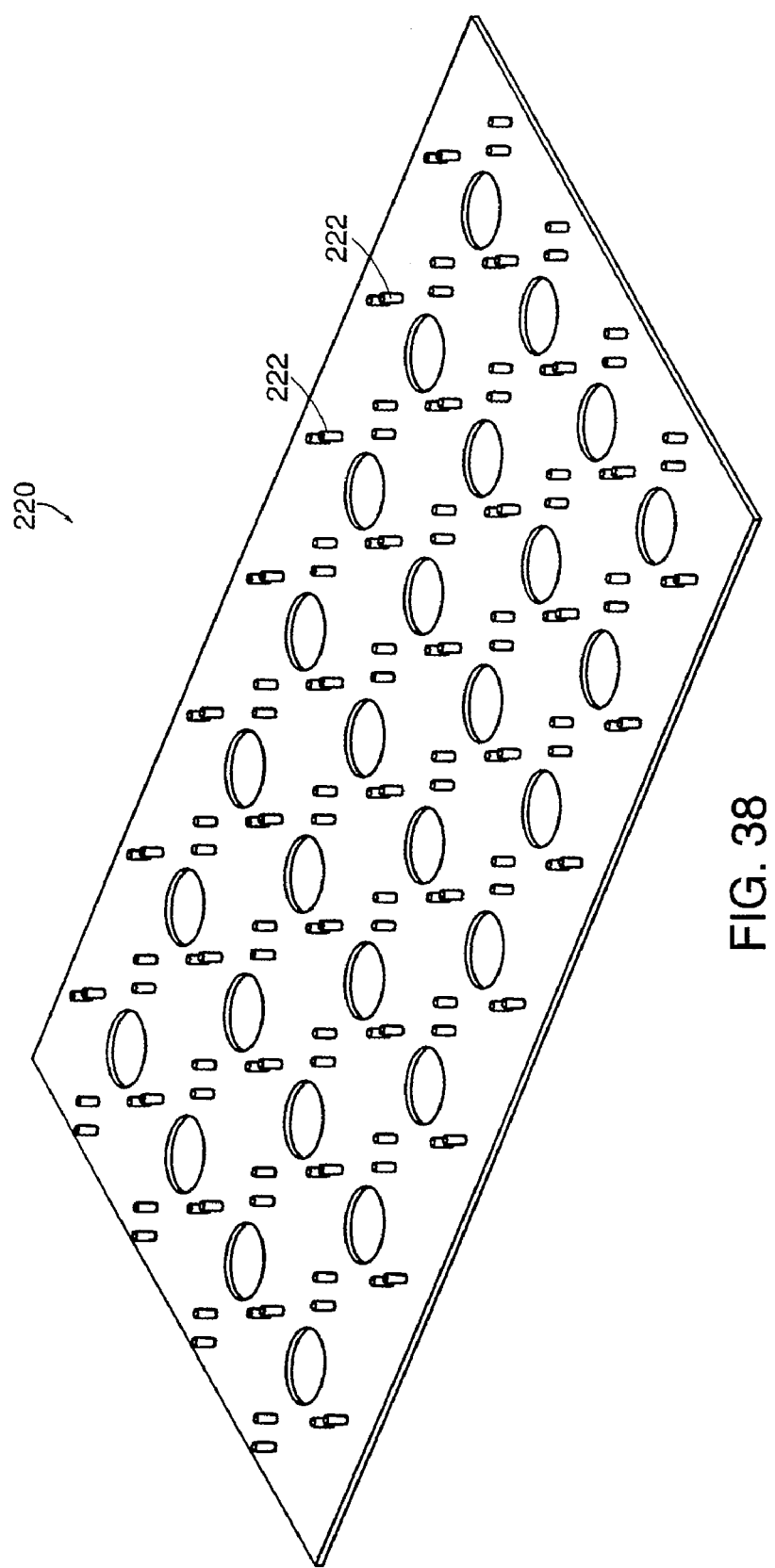
FIG. 38 is a perspective view of a third tactile feedback sheet for use under a keypad cover.

FIG. 38 shows an elastomeric sheet 220 that provides tactile feedback over an entire IACK keypad surface with discrete elements 222 that extend, with the keypad assembled, between the cover and substrate. These elements 222 extend perpendicularly with respect to the base of sheet 220 (as shown), to operate in a pure buckling mode as the cover is pressed against the substrate, or may be canted. Elements 222 may be solid cylinders or vertical tubes.

FIG. 39 shows snap elements 14 molded with a common sheet 61 that is separate from IACK element 10. Snap elements 14 are conical with their narrow ends 230 directed downward, away from cover 10. Additional thickness is provided at narrow ends 230, forming a block of material to increase the "snappiness" or crisp feel of the tactile feedback provided by the domes.

Figure 40:
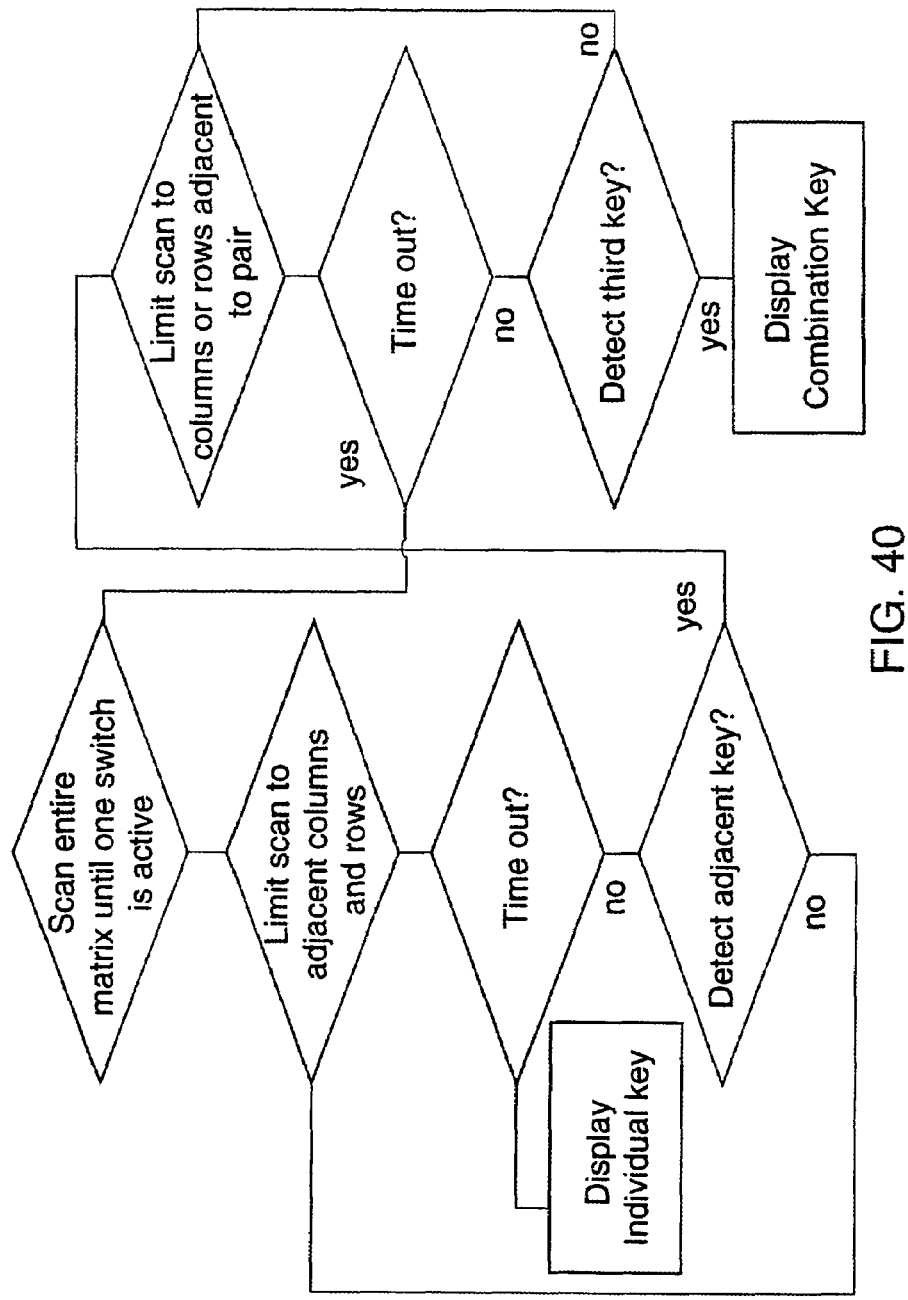
FIG. 40 shows a scan algorithm for use with an IACK keypad.

FIG. 40 shows a scan algorithm that enables a particularly slow clock scan rate, thereby saving energy. As soon as one switch of the keypad is activated, the scan is limited to adjacent keys. If a second key switch is activated within the wait time, the system searches only rows (or columns) above and below (adjacent to) the actuated pair. This is continued until an individual key is actuated for the duration of the wait time, or until opposing diagonals are detected.

Figure 41:
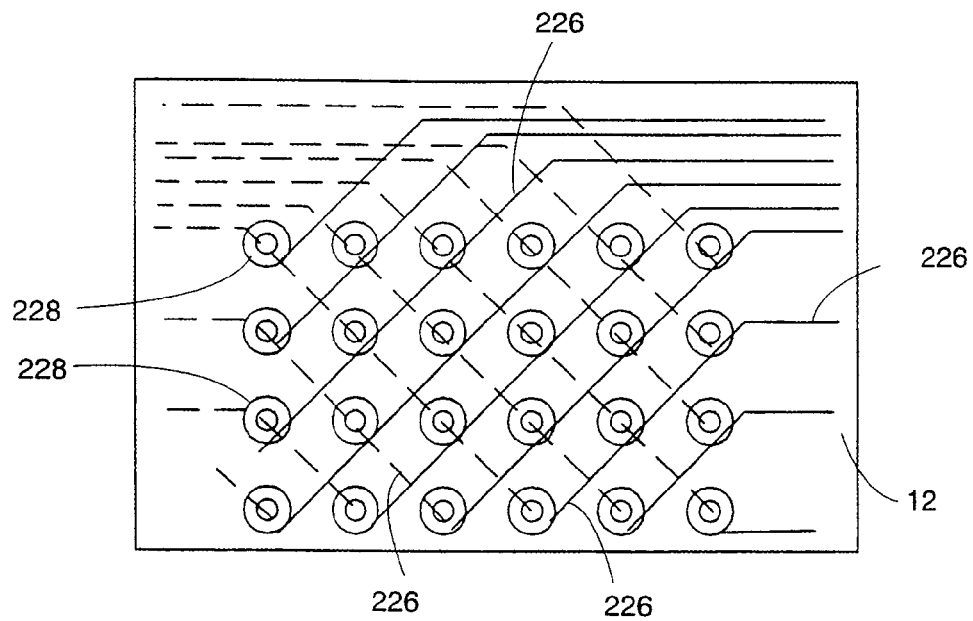
FIG. 41 shows a printed circuit board with traces extending at a 45-degree angle with respect to the key switch matrix.

FIG. 41 shows a printed circuit board 12 with the traces 226 at a 45-degree angle with respect to the board outline in the keypad grid area. The dashed lines represent traces connected with the center rings of domed snap switches 228. The solid lines represent traces connected with the peripheral rings of those switches. Because individual keys located at adjacent opposing diagonals define combination keys, this layout provides a simplified recognition algorithm. This hardware change redefines the software so that simultaneous output from adjacent traces indicates combination key output.

Figure 42:
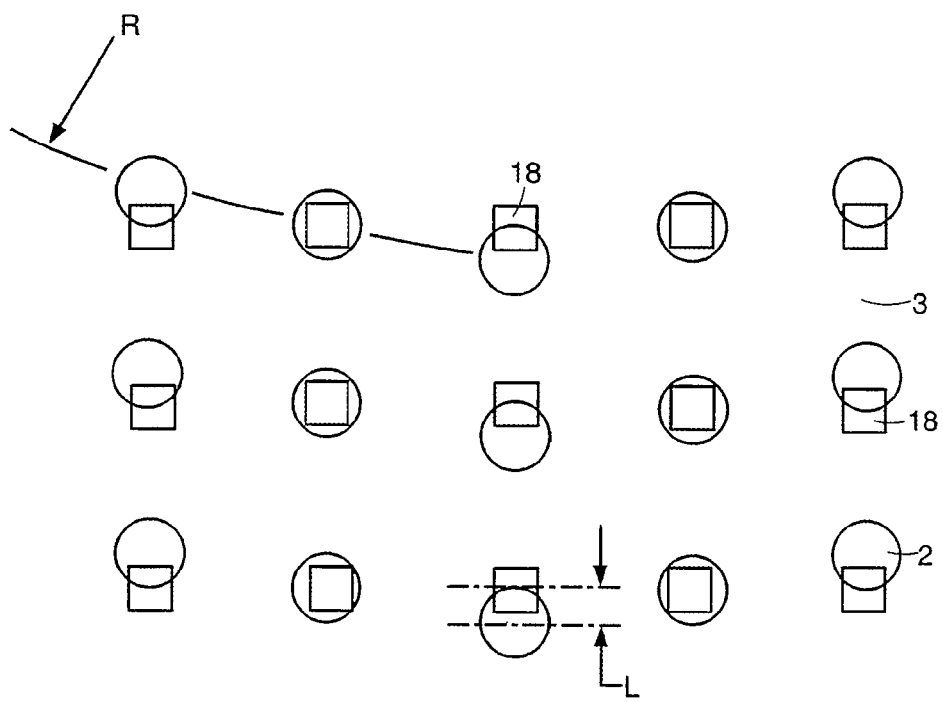
FIG. 42 shows an arcuate arrangement of independent key region centers superimposed upon a rectilinear switch grid matrix.

In FIG. 42, the rows of independent key regions 2 have been skewed to follow arcs defined by radius "R", such as to help to identify location across the keypad by touch, while their corresponding key switch pads 18 remain arranged along orthogonal rows and columns, resulting in a vertical offset "L" between centers of the independent key regions 2 and their switch pads 18 in certain columns. In far left and right columns, the independent key regions are slightly above their switch pad centers, in face view, while in the center column the opposite shift obtains. This keeps the switch matrix spacing constant, even though the spacing between diagonally adjacent independent key regions varies.

Figure 43:
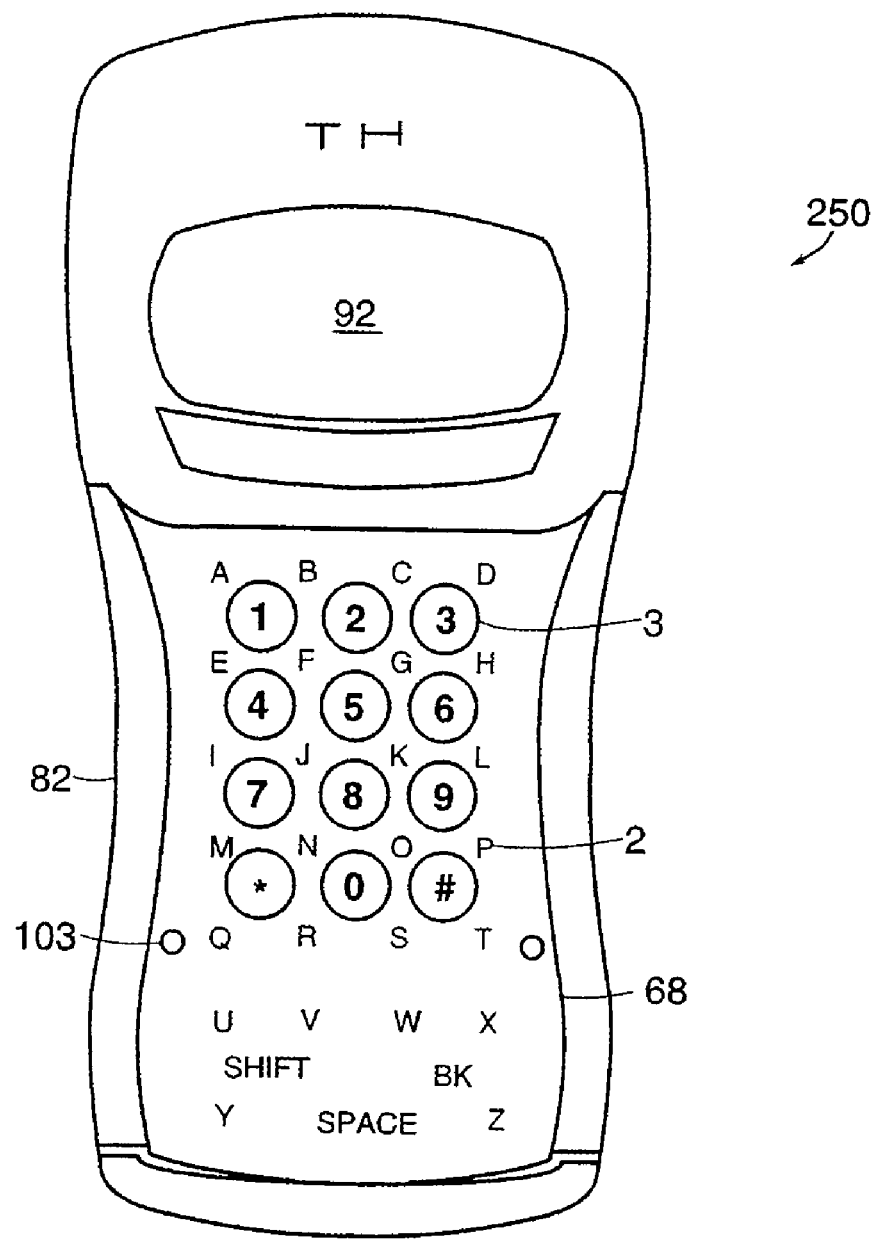
FIGS. 43 and 44 and face and perspective views, respectively, of a mobile telephone with an IACK keypad.
Figure 44:
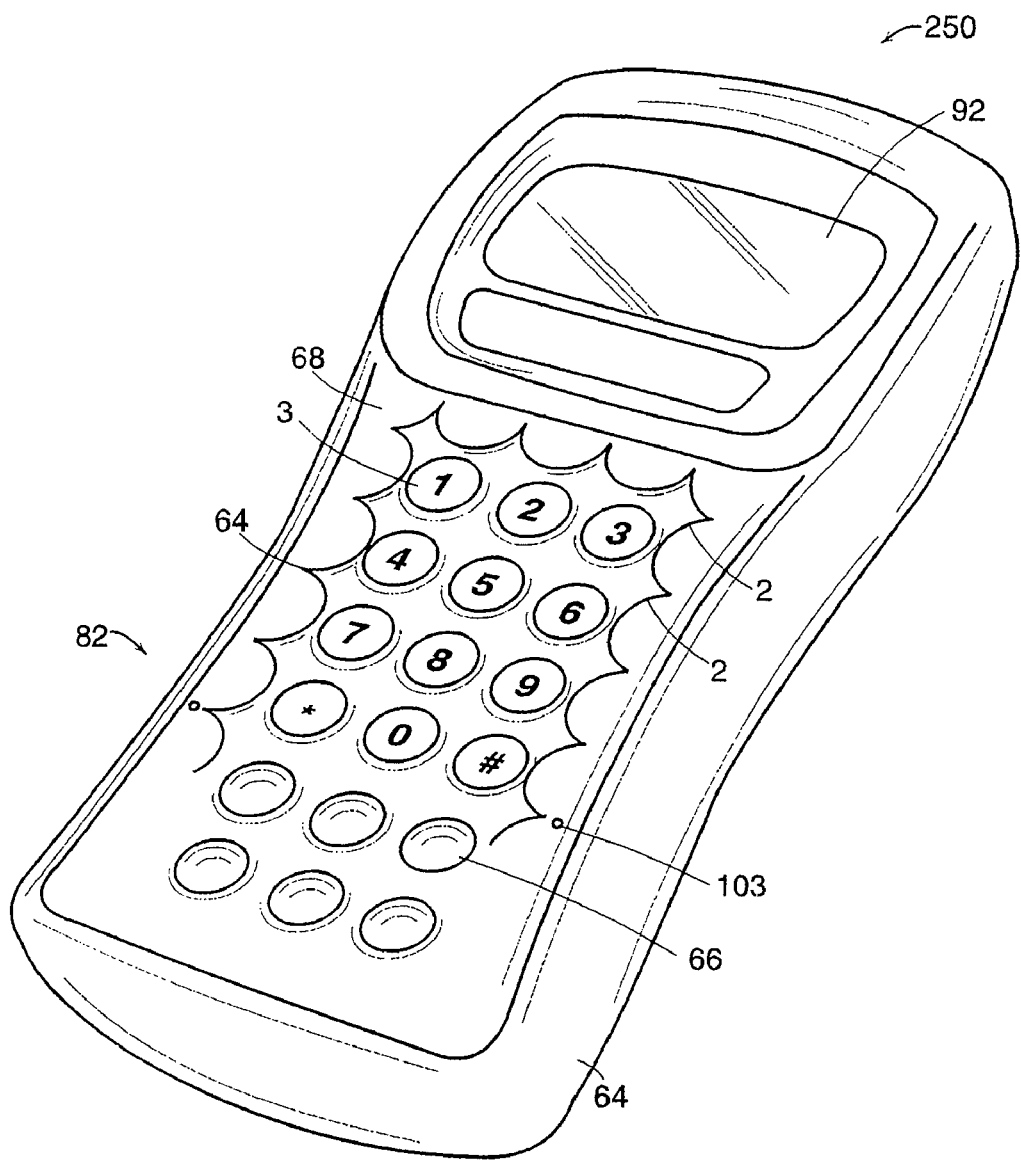

Referring now to FIGS. 43 and 44, a mobile telephone 250 incorporates the keypad cover 82 of FIGS. 29 and 30, and a display 92 for displaying alphanumeric text.

A number of embodiments of the invention have been described. Nevertheless, it will be understood that various modifications may be made without departing from the spirit and scope of the invention. Accordingly, other embodiments are within the scope of the following claims.

What is claimed is:

1. An electronic device comprising
   a substrate carrying a first array of spaced apart, conductive trace elements;
   a flexible cover disposed above the substrate and carrying a second array of spaced apart, conductive trace elements, said first and second arrays together forming a coordinate system, the cover separated from the substrate by an array of resilient, collapsible elements and having an exposed, continuous surface;
   the first and second arrays of trace elements forming a capacitive grid responsive to presence of a digit of an operator on the surface of the cover; and
   an electronic circuit adapted to sense a capacitive state of the grid and to determine a position of said digit upon the sensed capacitive state.

2. The electronic device of claim 1 wherein said continuous surface defines key regions of a keypad; and wherein said electronic circuit interprets an intended keypad input based at least in part upon the sensed capacitive state.

3. The electronic device of claim 1 wherein the capacitive grid is responsive to a position of local deflection of the cover toward the substrate.

4. The electronic device of claim 1 wherein the second array of trace elements is disposed on a surface of the cover closest the substrate.

5. The electronic device of claim 1 in the form of an IACK keypad, with the exposed cover surface defining both independent key regions and combination key regions.

6. The electronic device of claim 1 wherein the collapsible elements comprise formations integrally molded to extend from a surface of the cover facing the substrate.

7. A keypad comprising
   a substrate carrying an array of sense elements arranged to change state in response to keypad operation;
   a flexible cover disposed above the substrate and having an exposed surface defining an array of elevated key regions, with non-elevated key regions defined in interstices between adjacent elevated key regions; and
   an array of discrete snap elements extending between the cover and the substrate and spacing the cover from the substrate, the snap elements each located between two adjacent elevated key regions and adapted to resiliently collapse as a non-linear response to local pressure against the exposed cover surface to provide tactile feedback in response to pressure against both elevated key regions and non-elevated key regions,
   wherein the snap elements are arranged to provide a substantially equal tactile feedback in response to activating both elevated key regions and non-elevated key regions.

8. The keypad of claim 7 wherein the snap elements are located under the non-elevated key regions.

9. The keypad of claim 7 wherein the snap elements are located between directly adjacent elevated key regions.

10. The keypad of claim 7 wherein the snap elements include snap elements located under the non-elevated key regions and snap elements located directly between directly adjacent elevated key regions.

11. The keypad of claim 7 wherein each elevated key region and each non-elevated key region has four corresponding, spaced-apart snap elements disposed at its periphery, with each interstice between four adjacent snap elements corresponding to a key region.

12. The keypad of claim 11 wherein the snap elements are each located equidistant between centers of adjacent elevated key regions and equidistant between centers of adjacent non-elevated key regions.

13. The keypad of claim 12 wherein each elevated key region defines an exposed contact pressure area, the keypad further comprising an array of conductive pills between the substrate and cover, each conductive pill centered below a corresponding elevated key region and extending laterally farther than the contact pressure area of its associated elevated key region.

14. The keypad of claim 13 wherein each conductive pill extends laterally farther toward an adjacent non-elevated key region than the contact pressure area of its associated elevated key region.

15. The keypad of claim 13 wherein the elevated key regions are of diamond shape, with arms directed between adjacent non-elevated key regions.

16. The keypad of claim 11 wherein each pair of adjacent elevated key regions has three of said snap elements disposed along a line segment disposed midway between the pair of elevated key regions.

17. The keypad of claim 16 wherein the three snap elements are equally spaced along the line segment, with one directly between centers of the elevated key regions of the pair, and one at either end of the line segment, at an interstice between four adjacent elevated key regions.

18. The keypad of claim 7 wherein the snap elements are of elastomer integrally molded with and extending from a back surface of the cover.

19. The keypad of claim 7 wherein the snap elements are molded of silicone.

20. The keypad of claim 7 wherein the snap elements are of frustoconical shape.

21. The keypad of claim 7 wherein the sense elements are arranged beneath corresponding elevated key regions.

22. The keypad of claim 21 wherein the non-elevated key regions are disposed between adjacent sense elements, such that an input corresponding to any of the non-elevated key regions is determined as a function of actuation of sense elements adjacent that non-elevated key region.

23. A keypad comprising
a substrate carrying an array of sense elements arranged to change state in response to keypad operation; a flexible cover disposed above the substrate and having an exposed surface defining an array of elevated key regions, with non-elevated
key regions defined in interstices between adjacent elevated key regions; and
an array of discrete snap elements extending between the cover and the substrate and spacing the cover from the substrate, the snap elements each located between two adjacent elevated key regions and adapted to resiliently collapse toward the substrate as a non-linear response to local pressure against the exposed cover surface to provide tactile feedback of keypad operation, the snap element each being symmetric in shape about an associated axis perpendicular to the substrate and intersecting the cover between adjacent elevated key regions, wherein the snap elements are arranged to provide a substantially equal tactile feedback in response to pressure against both elevated and non-elevated key regions.

24. The keypad of claim 23 wherein the snap elements are frustoconical in shape.

25. The keypad of claim 23 wherein each elevated key region has at least four corresponding, spaced-apart snap elements disposed at its periphery, with each interstice between four adjacent snap elements corresponding to a key region.

26. The keypad of claim 23 wherein the snap elements are of elastomer integrally molded with and extending from a back surface of the cover.

27. A keypad comprising
a substantially planar substrate carrying an array of sense elements arranged to change state in response to keypad operation;
a flexible cover disposed above the substrate and having an exposed surface defining an array or key regions arranged in rows, the key regions comprising alternating rows of elevated and non-elevated key regions, with at least some non-elevated key regions disposed between four adjacent elevated key regions; and
at least one continuous, elongated snap element extending adjacent at least three key regions of one row of elevated key regions, between the cover and the substrate and spacing the cover from the substrate, the snap element adapted to resiliently collapse as a non-linear response to local pressure against the exposed cover surface to provide tactile feedback of keypad operation.

28. The keypad of claim 27 comprising multiple snap elements in the form of elongated rails extending between adjacent rows of key regions.

29. The keypad of claim 27 wherein the snap element comprises a rib extending at an angle with respect to the plane of the substrate and configured to buckle in response to local pressure against the exposed cover surface.

30. The key pad of claim 29 wherein the angle is about 60 degrees.

31. A keypad comprising
a substrate carrying an array of sense elements arranged to change state in response to keypad operation;
a flexible cover disposed above the substrate and having an exposed surface defining an array of elevated key regions, with non-elevated key regions defined in interstices between adjacent elevated key regions; and
an array of discrete snap elements extending between the cover and the substrate and spacing the cover from the substrate, the snap elements each located between two adjacent elevated key regions and adapted to resiliently collapse as a non-linear response to local pressure against the exposed cover surface to provide tactile feedback in response to pressure against both elevated key regions and non-elevated key regions,
wherein the snap elements are constructed and arranged to require a substantially equal normal activation force for both elevated key regions and non-elevated key regions.

32. The keypad of claim 31 wherein the snap elements are located under the non-elevated key regions.

33. The keypad of claim 31 wherein the snap elements are located between directly adjacent elevated key regions.

34. The keypad of claim 31 wherein the snap elements include snap elements located under the non-elevated key regions and snap elements located directly between directly adjacent elevated key regions.

35. The keypad of claim 31 wherein each elevated key region and each non-elevated key region has four corresponding, spaced-apart snap elements disposed at its periphery, with each interstice between four adjacent snap elements corresponding to a key region.

36. The keypad of claim 35 wherein the snap elements are each located equidistant between centers of adjacent elevated key regions and equidistant between centers of adjacent non-elevated key regions.

37. The keypad of claim 36 wherein each elevated key region defines an exposed contact pressure area, the keypad further comprising an array of conductive pills between the substrate and cover, each conductive pill centered below a corresponding elevated key region and extending laterally farther than the contact pressure area of its associated elevated key region.

38. The keypad of claim 37 wherein each conductive pill extends laterally farther toward an adjacent non-elevated key region than the contact pressure area of its associated elevated key region.

39. The keypad of claim 37 wherein the elevated key regions are of diamond shape, with arms directed between adjacent non-elevated key regions.

40. The keypad of claim 35 wherein each pair of adjacent elevated key regions has three of said snap elements disposed along a line segment disposed midway between the pair of elevated key regions.

41. The keypad of claim 40 wherein the three snap elements are equally spaced along the line segment, with one directly between centers of the elevated key regions of the pair, and one at either end of the line segment, at an interstice between four adjacent elevated key regions.

42. The keypad of claim 31 wherein the snap elements are of elastomer integrally molded with and extending from a back surface of the cover.

43. The keypad of claim 31 wherein the snap elements are molded of silicone.

44. The keypad of claim 31 wherein the snap elements are of frustoconical shape.

45. The keypad of claim 31 wherein the sense elements are arranged beneath corresponding elevated key regions.

46. The keypad of claim 45 wherein the non-elevated key regions are disposed between adjacent sense elements, such that an input corresponding to any of the non-elevated key regions is determined as a function of actuation of sense elements adjacent that non-elevated key region.

* * * * *

UNITED STATES PATENT AND TRADEMARK OFFICE
CERTIFICATE OF CORRECTION

PATENT NO. : 7,391,861 B2
APPLICATION NO. : 09/862948
DATED : June 24, 2008
INVENTOR(S) : David H. Levy It is certified that error appears in the above-identified patent and that said Letters Patent is hereby corrected as shown below:

Title Pg, Item (57) (Abstract), line 14, after "correspondence" insert -- . --.

Col. 25, line 67, delete "or" and insert -- of --.

Signed and Sealed this

Thirtieth Day of September, 2008

JON W. DUDAS
*Director of the United States Patent and Trademark Office*